(12) United States Patent
Dreyer et al.

(10) Patent No.: US 6,282,026 B1
(45) Date of Patent: *Aug. 28, 2001

(54) RETROREFLECTORS HAVING TWO OPTICAL SURFACES AND VARYING RETROREFLECTIVITY

(75) Inventors: John F. Dreyer, North Oaks; Madeleine B. Fleming, Oakdale, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,113

(22) Filed: Feb. 5, 1998

(51) Int. Cl.$^7$ .................................................. G02B 5/122
(52) U.S. Cl. .......................... 359/529; 359/518; 359/530; 359/531; 359/532; 359/539; 359/900
(58) Field of Search ..................................... 359/515, 516, 359/519, 527, 529–532, 534–540, 900, 542, 546, 547, 551, 552

(56) References Cited

U.S. PATENT DOCUMENTS

| | | |
|---|---|---|
| 752,429 | 2/1904 | Wadsworth . |
| 1,128,979 | 2/1915 | Hess . |
| 1,475,430 | 11/1923 | Curwen . |
| 1,792,731 | 2/1931 | Craig . |

(List continued on next page.)

FOREIGN PATENT DOCUMENTS

| | | |
|---|---|---|
| 8324 | 9/1909 | (GB) . |
| 423464 | 1/1934 | (GB) . |
| 441319 | 7/1934 | (GB) . |
| WO 97/41464 | 11/1997 | (WO) . |
| WO 97/41465 | 11/1997 | (WO) . |

*Primary Examiner*—James Phan
(74) *Attorney, Agent, or Firm*—Rudolph P. Hofmann, Jr.

(57) ABSTRACT

Retroreflective articles provide varying retroreflection using a first surface that includes a plurality of light redirecting structures and a second surface that includes retroreflective areas and separation areas. The light redirecting structures on the first surface are preferably arranged relative to the retroreflective areas and the separation areas on the second surface such that a substantial portion of light incident on the light redirecting structures is superimposed on areas of the second surface. At some angles, it is preferred that substantially all of the light is superimposed on either the retroreflective areas or the separation areas, resulting in varying retroreflection from the retroreflective articles. Together, the two optical surfaces of the retroreflective articles provide varying retroreflection of incident light where the variations can be between, e.g., retroreflection or no retroreflection, retroreflection of different colors, retroreflection at different brightness levels, etc. In other words, when subjected to incident light from a steady light source, relative movement between the retroreflective article and the light source will result in variations in retroreflection. When retroreflective articles provide varying retroreflection, the variations or changes will tend to increase the conspicuity of an object or person on which the retroreflective article is located.

34 Claims, 16 Drawing Sheets

U.S. PATENT DOCUMENTS

| | | |
|---|---|---|
| 1,987,357 | 1/1935 | Bergen et al. . |
| 2,268,351 | 12/1941 | Tanaka . |
| 2,432,896 | 12/1947 | Hotchner . |
| 2,951,419 | 9/1960 | Lemelson . |
| 3,085,473 | 4/1963 | Bourgeaux et al. . |
| 3,085,474 | 4/1963 | Bourgeaux et al. . |
| 3,712,706 | 1/1973 | Stamm . |
| 3,830,682 | 8/1974 | Rowland . |
| 3,844,635 | 10/1974 | Atkins . |
| 3,926,402 | 12/1975 | Heenan . |
| 3,966,301 | 6/1976 | Brown . |
| 3,975,083 | 8/1976 | Rowland . |
| 4,012,115 | 3/1977 | Brown . |
| 4,025,159 | 5/1977 | McGrath . |
| 4,208,090 | 6/1980 | Heenan . |
| 4,349,598 | 9/1982 | White . |
| 4,542,449 | 9/1985 | Whitehead . |
| 4,576,850 | 3/1986 | Martens . |
| 4,582,885 | 4/1986 | Barber . |
| 4,588,258 | 5/1986 | Hoopman . |
| 4,634,220 | 1/1987 | Hockert et al. . |
| 4,645,301 | 2/1987 | Orensteen et al. . |
| 4,650,283 | 3/1987 | Orensteen et al. . |
| 4,668,558 | 5/1987 | Barber . |
| 4,688,894 | 8/1987 | Hockert . |
| 4,691,993 | 9/1987 | Porter et al. . |
| 4,708,920 | 11/1987 | Orensteen et al. . |
| 4,714,656 | 12/1987 | Bradshaw et al. . |
| 4,726,134 | 2/1988 | Woltman . |
| 4,895,428 | 1/1990 | Nelson et al. . |
| 4,906,070 | 3/1990 | Coob, Jr. . |
| 4,938,563 | 7/1990 | Nelson et al. . |
| 4,948,228 | 8/1990 | Keens . |
| 4,983,436 | 1/1991 | Bailey et al. . |
| 5,050,327 | 9/1991 | Woltman . |
| 5,066,327 | 11/1991 | Kult et al. . |
| 5,122,902 | 6/1992 | Benson . |
| 5,237,449 | 8/1993 | Nelson et al. . |
| 5,254,390 | 10/1993 | Lu . |
| 5,272,562 | 12/1993 | Coderre . |
| 5,387,458 | 2/1995 | Pavelka et al. . |
| 5,450,235 | 9/1995 | Smith et al. . |
| 5,471,348 | 11/1995 | Miller et al. . |
| 6,045,230 | 4/2000 | Dreyer et al. ............ 359/529 |

RETROREFLECTORS HAVING TWO OPTICAL SURFACES AND VARYING RETROREFLECTIVITY

FIELD OF THE INVENTION

The present invention relates to the field of retroreflective articles that have two optical surfaces.

BACKGROUND

Nighttime visibility of objects and people is a continuing problem, particularly for the operators of vehicles such as trucks and automobiles. Approaches to increasing their nighttime visibility can be either active or passive. Active systems provide conspicuity by providing a steady light source, flashing light source, or a combination of steady and flashing light sources. Although active systems do provide conspicuity, they must be provided with energy, typically electrical energy, to provide the desired light. Energy sources are not always available or they may be depleted such that the light sources will not operate. As a result, active systems find limited application for providing long term conspicuity.

Examples of passive systems include diffuse reflectors, specular reflectors, and/or retroreflectors. Retroreflectors can return a significant portion of incident light, that would otherwise be reflected elsewhere, back towards a light source, such as the headlights of a car or truck. Retroreflectors are typically constructed of beads (see, e.g., U.S. Pat. Nos. 4,025,159 to McGrath; 4,983,436 to Bailey et al.; and 5,066,098 to Kult et al.) or they can include cube corner elements (see, e.g., U.S. Pat. Nos. 5,272,562 to Coderre and 5,450,235 to Smith et al.). With many retroreflectors, the amount of returned light can make the retroreflective article appear as though it has a light source of its own when, in reality, at least a portion of the light directed at the retroreflector from the light source is merely being returned towards the source. Although retroreflectors return a significant portion of light, the incident light is typically from a steady source such as headlights. Steady incident light yields generally steady returned light from the retroreflectors, that is, the intensity of the returned light does not appreciably vary.

Investigators have made various strides towards improving the conspicuity of retroreflective articles. For example, Shusta et al. in PCT publications WO 97/41465 and 97/41464 (U.S. patent application Ser. Nos. 08/640,326 and 08/640,383) describe a retroreflective article that glitters when exposed to light. Fluorescent dyes have also been used to improve conspicuity—see for example, U.S. Pat. Nos. 5,387,458 and 3,830,682. U.S. Pat. No. 4,726,134 describes a retroreflective sign which has areas that vary in retroreflectivity to improve the sign's conspicuity.

SUMMARY OF THE INVENTION

The present invention provides an alternative approach to improving conspicuity of retroreflective articles. In accordance with the present invention, a retroreflective article is provided that has varying retroreflectivity using a first surface that includes a plurality of light redirecting structures and a second surface that includes retroreflective areas and separation areas. The light redirecting structures on the first surface are preferably arranged relative to the retroreflective areas and the separation areas on the second surface such that a substantial portion of light incident on the light redirecting structures is superimposed on areas of the second surface. At some angles, it is preferred that substantially all of the light is superimposed on either the retroreflective areas or the separation areas, resulting in varying retroreflection from the retroreflective articles.

Together, the two optical surfaces of the retroreflective articles provide varying retroreflection of incident light where the variations can be between, for example, retroreflection or no retroreflection, retroreflection of different colors, retroreflection at different brightness levels, etc. In other words, when subjected to incident light from a steady light source, relative movement between the retroreflective article and the light source will result in variations in retroreflection. When retroreflective articles provide varying retroreflection, the variations or changes tends to increase the conspicuity of the retroreflective articles.

In one aspect, the present invention provides a retroreflective article having a first surface including a plurality of light redirecting structures; a second surface opposite the first surface, the second surface including a plurality of retroreflective areas retroreflecting light towards the first surface; and a plurality of separation areas on the second surface, each of the separation areas located between the retroreflective areas; wherein a substantial portion of light incident on the plurality of light redirecting structures on the first surface of the retroreflective article at a given angle is superimposed on the second surface of the retroreflective article.

In another aspect, the present invention provides a retroreflective article having a first surface including a plurality of light redirecting structures, each of the light redirecting structures comprising a facet pair including two facets located in facet planes, the facet planes of each facet pair intersecting along a line of intersection, wherein the lines of intersection for each of the facet pairs are generally aligned with a first axis; a second surface including a plurality of retroreflective areas, each of the retroreflective areas having a plurality of retroreflective structures retroreflecting light towards the first surface, wherein the retroreflective areas comprise columns generally aligned with the first axis; and a plurality of separation areas on the second surface, each of the separation areas located between the retroreflective areas; wherein at least a portion of light incident on each of the facet pairs on the first surface of the retroreflective article at a given angle is superimposed on the second surface of the retroreflective article.

In another aspect, the present invention provides a retroreflective article including a body having a first surface and a second surface opposite the first surface; a plurality of retroreflective areas on the second surface of the body, the retroreflective areas including a plurality of retroreflective structures, wherein the retroreflective areas are provided in columns generally aligned with a first axis; a plurality of separation areas on the second surface of the body, each of the separation areas located between the retroreflective areas; an optical window located between the first and second surfaces, the optical window transmitting light into the body; and a plurality of light directing structures located on the first surface of the body, wherein a substantial portion of light incident on the plurality of light redirecting structures at a given angle from the optical window is superimposed on the second surface of the retroreflective article.

In another aspect, the present invention provides a method of manufacturing a retroreflective article by providing a first surface including a plurality of light redirecting structures and a second surface opposite the first surface, the second surface being separated from the second surface by an optically transmissive medium; providing a light curable binder solution on the second surface; providing a plurality of retroreflective beads proximate the second surface, each of the plurality of retroreflective beads at least partially immersed in the binder solution; forming retroreflective areas on the second surface by directing light energy through the first surface to cure selected areas of the binder solution on the second surface, wherein the binder solution in the selected areas is sufficiently cured to retain a substantial portion of the retroreflective beads; and removing the retroreflective beads from the uncured binder solution on the second surface to form separation areas between the retroreflective areas; wherein a substantial portion of light incident on the plurality of light redirecting structures on the first surface of the retroreflective article at a given angle is superimposed on the second surface of the retroreflective article.

In another aspect, the present invention also provides articles of clothing including the retroreflective articles according to the present invention.

These and other features and advantages of the articles and methods according to the present invention are discussed more completely below in connection with illustrative embodiments of the inventions.

BRIEF DESCRIPTION OF THE DRAWINGS

FIGS. 5aa–5cc are schematic representations depicting the appearance of the retroreflective articles of FIGS. 5a–5c under different conditions.

DETAILED DESCRIPTION OF ILLUSTRATIVE EMBODIMENTS OF THE INVENTION

Figure 1:
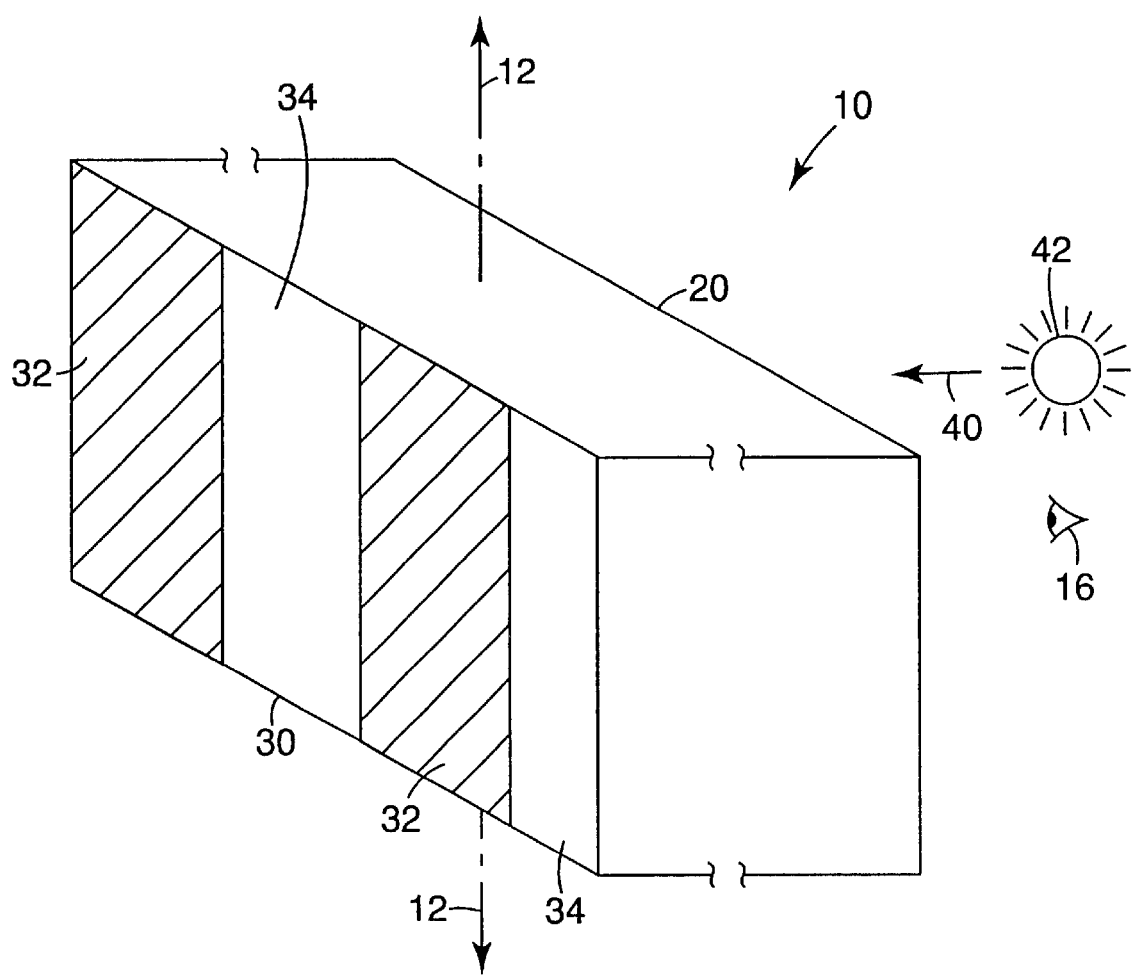
FIG. 1 is a perspective view of one retroreflective article according to the present invention.

The retroreflective articles according to the present invention are able to provide the effects described herein because they include a first surface with light redirecting structures that, in effect, superimpose a majority of light incident on a first area of the first surface at a first angle on a second area of the second surface, where the second area is smaller than the first area. In other words, the light redirecting structures superimpose the light incident on the first area at a first angle on the smaller second area on the second surface. Because the second surface includes areas that provide at least two different optical effects, e.g., retroreflective and absorptive, the superposition (without focusing) of light results in articles that provide different optical effects based on the incident light's approach angle.

It is preferred that, for all of the light approaching the first surface of the retroreflective article according to the present invention at some discrete angles, substantially all of the light is superimposed on either the retroreflective areas or the separation areas to achieve the largest variations in the intensity or brightness of retroreflection from the retroreflective articles. To do that, it is preferred that the second area on which the light is superimposed by the light redirecting structures on the front surface be no larger than the retroreflective areas or the separation areas. It will be understood, however, that these limitations are not required in all retroreflective articles according to the present invention.

The modulating or varying nature of the retroreflection from retroreflective articles according to the present invention can take a number of different forms. In one form, the variations can result in retroreflection or no reflection, i.e., on/off retroreflection, or it may take the form of retroreflection that changes between two or more different colors. In another aspect, the variations can be in brightness or intensity of the retroreflected light. In yet another variation, the retroreflective article may exhibit two or more different types of flashing retroreflection, e.g., on/off and different color retroreflection, under certain conditions. In still other variations, the retroreflective articles may exhibit apparent motion as successive portions of the retroreflective article retroreflect incident light or the retroreflective article may have retroreflective portions that have different entrance angularity or observation angularity.

The figures used to illustrate the principles of retroreflective articles according to the present invention are not drawn to scale, particularly with respect to the distances between the first and second surfaces in retroreflective articles according to the present invention. Typically, the distance between the first and second surfaces in retroreflective articles according to the present invention will be larger than the dimensions of the structures on the first and second surfaces.

Although substantially all of the light retroreflected by the articles according to the present invention is slightly displaced or translated during retroreflection (see, e.g., the discussion relating to FIG. 1A below), these displacements will generally be ignored for the sake of simplicity when describing the inventive retroreflective articles and the articles' effect on light.

Furthermore, although the retroreflective articles according to the present invention will be described as having first and second surfaces, it will be understood that the first and/or second surfaces may themselves be embedded within the body of one or more objects, i.e., the first and/or second surfaces may not be exposed on the exterior of an object or objects used to provide the retroreflective articles of the present invention. In addition, the first and second surfaces can be provided in a single, integral body or they could be provided using two or more bodies.

Also, retroreflective articles according to the present invention will tend to work better for light approaching the first surface of the article at a relatively small angle relative to an axis normal to the first surface. Light approaching at large angles off of normal may experience significant reflection at the first surface such that the transmission of light through the surface is significantly reduced. Additionally, even if high angle light is transmitted through the first surface, it may approach the retroreflective areas on the second surface of the article at angles outside of the working range of the retroreflective elements or structures used in the retroreflective areas, thereby resulting in limited or no retroreflection.

Although the light redirecting structures on the first surfaces and the retroreflective areas and separation areas on the second surfaces of retroreflective articles are generally described as being provided in regular shapes and repeating patterns below, it will be understood that they may instead be provided in irregular shapes and/or non-repeating patterns. Retroreflective articles in which the light redirecting structures on the first surface and/or the retroreflective areas and separation areas on the second surface are provided in irregular shapes and/or non-repeating patterns will still preferably exhibit modulating retroreflection. In some instances, the retroreflection may appear as sparkling retroreflection, where different portions of the retroreflective articles retroreflect light at different times and in different intensities based on the retroreflective light's approach angle.

The inventive retroreflective articles provide varying retroreflection with two opposing optical surfaces, one of the surfaces including light redirecting structures and the opposing surface including retroreflective areas and separation areas.

FIG. 1 shows a retroreflective article 10 that includes a first surface 20 and a second surface 30 located opposite the first surface 20. Light 40 from light source 42 is incident on first surface 20 of the retroreflective article 10.

Second surface 30 includes a plurality of retroreflective areas 32 that are designed to retroreflect light incident on them from the first surface 20 back towards the first surface 20 of the retroreflective article 10. In a preferred embodiment, the retroreflective areas 32 are columnar in shape and generally aligned with axis 12, although it will be understood that retroreflective areas with other shapes may also be used in connection with the present invention.

As depicted in FIG. 1, a separation area 34 is located between each pair of adjacent retroreflective areas 32 on retroreflective article 10. The separation areas 34 are, like the retroreflective areas 32, preferably generally columnar in shape and also generally aligned with axis 12, although it will be understood that separation areas with other shapes may also be used in connection with the present invention.

The width of the various features, i.e., light redirecting structures, retroreflective areas, and separation areas on the inventive retroreflective articles will be measured substantially transverse to the axis along which the preferably columnar features are generally aligned.

The separation areas 34 can provide a variety of optical effects. For example, the separation areas 34 may transmit incident light, they may absorb incident light, they may be specularly reflective, diffusely reflective or retroreflective. In addition, the separation areas may exhibit two or more different optical properties, e.g., they may include absorptive and transmissive portions or other combinations.

If at least a portion of the separation areas 34 are retroreflective, it is preferred that they exhibit retroreflection that is, in some respect, different than the retroreflection exhibited by the retroreflective areas 32. One example of a difference in retroreflection is a change in the brightness or intensity of the light retroreflected from the separation areas 34 as compared to the light retroreflected from the retroreflective areas 32. Another example of a difference in retroreflection is a change in the color of the light retroreflected from the separation areas 34 as compared to the color of light retroreflected from the retroreflective areas 32. Yet another difference could be in the entrance angularity or observation angularity of the retroreflective structures in the retroreflective areas 32 as compared to the separation areas 34.

The first surface 20 of the retroreflective article 10 includes light redirecting structures (not shown in FIG. 1) that preferably redirect light entering the retroreflective article 10 such that a majority (more preferably substantially all) of the light passing through the first surface 20 at a given entrance angle is redirected towards the second surface 30 at a second angle. Both the entrance angle and the angle in which the light is redirected are preferably measured relative to a normal axis defined by the first surface 20. Typically, the first and second angles will be different, although in a few isolated cases they may be equal (e.g., normal incident light on a planar refractive surface will pass through without a change in direction).

The light redirecting structures can operate to redirect light by reflection, refraction, diffraction, or a combination of two more of these effects. Examples of suitable light redirecting structures include, but are not limited to: refractive prismatic surfaces, Fresnel prisms, diffraction gratings, holograms, etc. It is preferred that the light redirecting structures do not exhibit substantial focusing power as would, e.g., curved surfaces such as lenticular lenses, convex or concave mirrors, Fresnel lenses, etc. Examples of suitable light redirecting structures that do not exhibit substantial focusing power include refractive prismatic surfaces that are substantially planar, Fresnel prisms have substantially parallel sub-facets, diffraction gratings having constant pitch, etc. As used in connection with the present invention, the term "light redirecting structure" will, therefore, be understood to include only structures that exhibit substantially no optical focusing power.

Figure 1A:
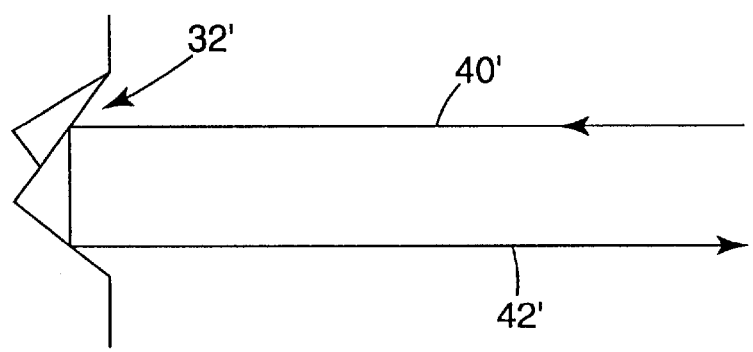
FIG. 1A is a schematic diagram illustrating the translational effect of a cube corner element on a representative ray of light.

The lack of any substantial focusing power is important because of the translation in the retroreflected light's path as compared to the path of the light redirected towards the second surface 30. As illustrated in FIG. 1A, light 40' entering a cube corner element 32' is translated across the cube corner element 32' as a part of the retroreflective process. As a result, the returned light 42' travels along a path that is slightly translated or displaced from the path followed by the light 40' when approaching the cube corner element 32'. As a result, the retroreflected light 42' would be returned to a different location on the first surface of a retroreflective article. If the light redirecting structures on that first surface were other than substantially planar facets, the light would be redirected along a path that is not parallel to the light entering the first surface of the retroreflective article.

Figure 2:
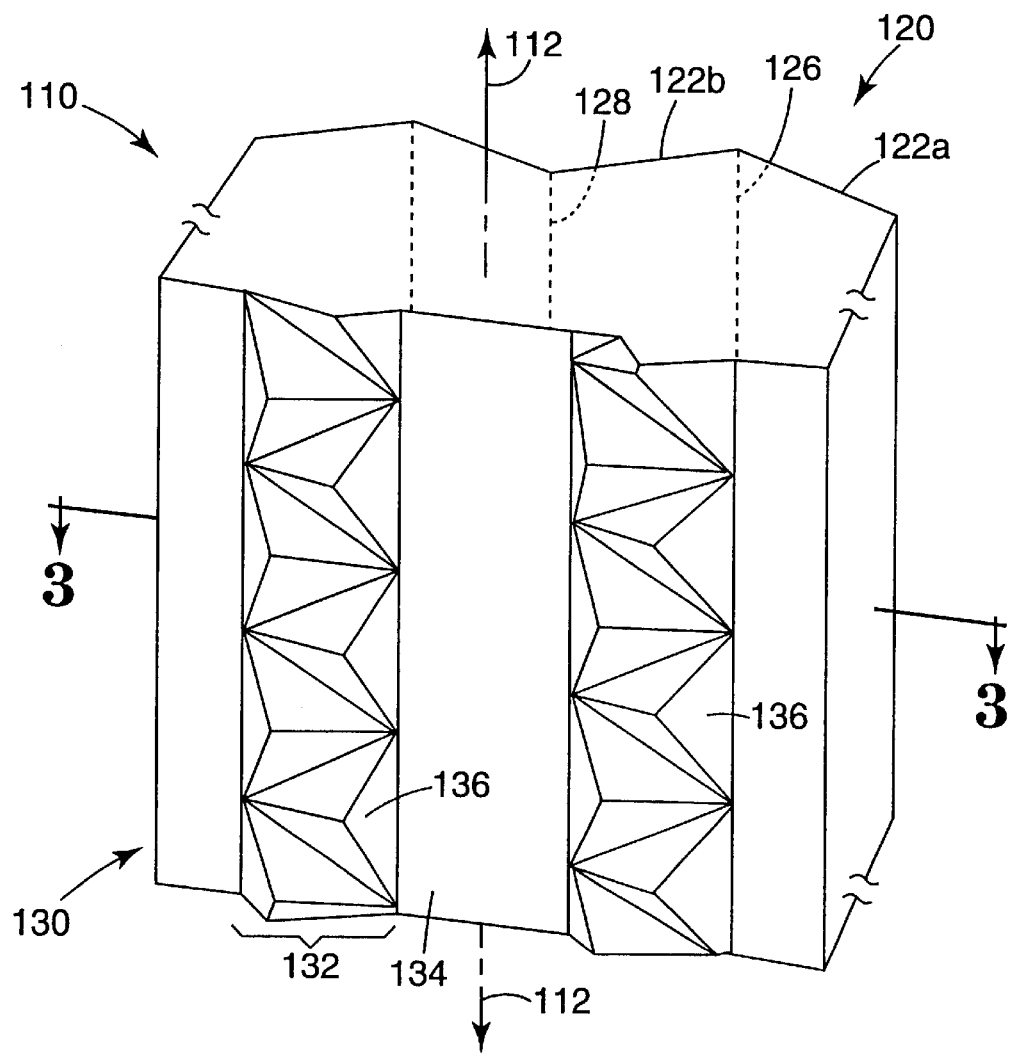
FIG. 2 is a perspective view of an alternative retroreflective article according to the present invention.
Figure 3:
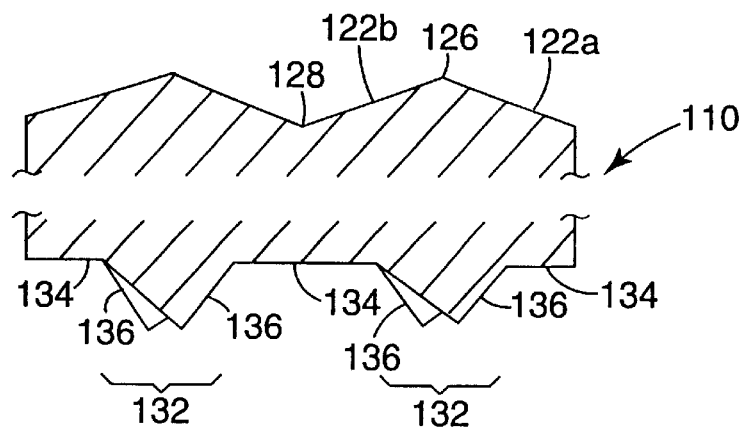
FIG. 3 is a cross-sectional view of the retroreflective article of FIG. 2 taken along line 3—3.

FIGS. 2 and 3 show a retroreflective article 110 that includes a first surface 120 and a second surface 130, where the first surface 120 includes light redirecting structures in the form of pairs of facets 122a and 122b, referred to generally as facets 122. The facets 122 are generally planar and lie in planes that intersect along line 126. Each pair of facets 122 intersects with the adjacent pair of facets 122 along line 128. The planes in which the facets 122 are located are also preferably parallel with axis 112 and, as a result, lines of intersection 126 and 128 are also preferably parallel to the axis 112. Alternatively, lines of intersection 126 and 128 may be slightly curved.

The second surface 130 includes retroreflective areas 132 and separation areas 134. The retroreflective areas 132 preferably include a plurality of retroreflective structures 136 that are arranged in columns where the columns are generally aligned with the axis 112. Preferred retroreflective structures 136 depicted in FIGS. 2 and 3 are cube corner elements, although the retroreflective areas 132 could include other retroreflective structures such as retroreflective beads or spheres, conical retroreflective elements and essentially any other elements capable of retroreflecting light.

The separation areas 134 in the retroreflective article 110 are preferably either transmissive or absorptive, such that light incident on separation areas 134 from the first surface 120 either exits the article 110 or is absorbed. The result of either transmissive or absorptive separation areas 134 is that, for light incident on the first surface 120, the retroreflective article 110 would exhibit a flash of retroreflection to an observer (not shown) viewing the first surface 120 of the retroreflective article 110 only when the facets 122 refract the incident light to the retroreflective areas 132 when there is relative motion between the light source and the retroreflectors.

Although the retroreflective articles described above (and those described below) include primarily symmetric light redirecting refractive facets, i.e., symmetric with respect to a normal axis and along the length of the facets, it should be understood that asymmetric facets could also be used in connection with the present invention. Asymmetric light redirecting facets will typically change the angles at which incident light is directed to the retroreflective areas or the separation areas on the second surface of the retroreflective articles.

Figure 4:
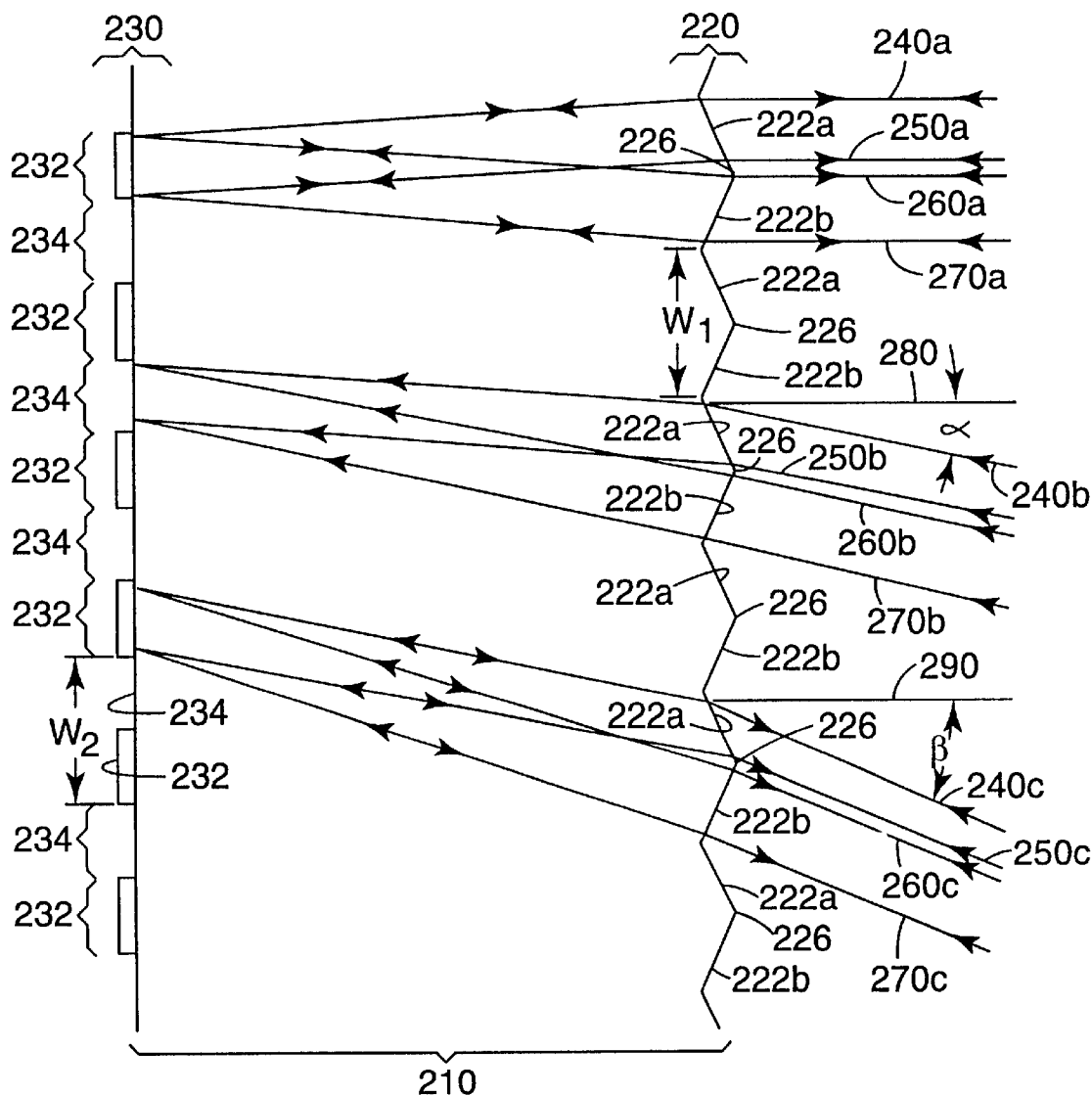
FIG. 4 is a cross-sectional view of another retroreflective article according to the present invention.

Another embodiment of light directing structures on the first surface of retroreflective articles according to the present invention are illustrated in FIG. 4. The retroreflective article 210 depicted there includes a first surface 220 and a second surface 230. The first surface 220 preferably includes a plurality of light directing structures in the form of pairs of refractive facets 222a and 222b (referred to generally as 222). The second surface 230 of the retroreflective article 210 includes both retroreflective areas 232 as well as separation areas 234.

The refractive nature of the facets is illustrated by the paths of the various light rays in FIG. 4. Ray 240a enters retroreflective article 210 through one of the facets 222 and is refracted towards one of the retroreflective areas 232. From the retroreflective area 232, the ray 240a is retroreflected back towards the facet 222 through which it entered the retroreflective article 210 where it then exits article 210 along a path that is generally parallel to the path along which ray 240a traveled when entering the retroreflective article 210.

Ray 250a enters retroreflective article 210 through one of the facets 222 and is refracted towards one of the retroreflective areas 232. Ray 250a is then retroreflected back towards the facet 222 through which it entered the retroreflective article 210 where it exits article 210 along a path that is generally parallel to the path along which ray 250a traveled when entering the retroreflective article 210.

Ray 260a enters retroreflective article 210 through one of the facets 222 where it is refracted towards one of the retroreflective areas 232. Ray 260a is then retroreflected back towards the facet 222 through which it entered the retroreflective article 210 where it then exits article 210 along a path that is generally parallel to the path along which ray 260a traveled when entering the retroreflective article 210.

Ray 270a enters retroreflective article 210 through one of the facets 222 and is refracted towards one of the retroreflective areas 232. Ray 270a is then retroreflected back towards the facet 222 through which it entered the retroreflective article 210 where it then exits article 210 along a path that is generally parallel to the path along which ray 270a traveled when entering the retroreflective article 210.

All of the rays 240a, 250a, 260a, and 270a, are parallel to each other and are incident on the article 210 along its normal axis. It will be understood that, based on the description and the illustration of the paths of light rays 240a, 250a, 260a, and 270a incident on the facets 222a and 222b, other light incident on other facets on the first surface 220 of retroreflective article 210 along the normal axis will be refracted by the facets towards one of the retroreflective areas 232 on the second surface 230. As a result, a majority of light incident on the refractive structures of the first surface 220 of article 210 along the normal axis will be refracted to one of the retroreflective areas 232. More preferably, substantially all of the light incident on the refractive structures of the first surface 220 of article 210 along the normal axis will be refracted to one of the retroreflective areas 232.

FIG. 4 also illustrates one approach angle α for which substantially all light passing through the facets 222 is refracted towards or superimposed on one of the separation areas 234 of the retroreflective article 210. Ray 240b enters retroreflective article 210 through one of the facets 222 and is refracted towards one of the separation areas 234. Ray 250b enters retroreflective article 210 through one of the facets 222 and is refracted towards one of the separation areas 234. Ray 260b enters retroreflective article 210 through one of the facets 222 where it is refracted towards one of the separation areas 234. Ray 270b enters retroreflective article 210 through one of the facets 222 and is refracted towards one of the separation areas 234.

In the preferred retroreflective articles 210, a majority of light incident on the refractive structures of the first surface 220 of article 210 along the angle α will be refracted to or superimposed on one of the separation areas 234. More preferably, substantially all of the light incident on the refractive structures of the first surface 220 of article 210 at the angle α will be refracted to or superimposed on one of the separation areas 234.

Rays 240b, 250b, 260b, and 270b are parallel to each other and approach the first surface 220 of the retroreflective article 210 at an angle α relative to the normal axis 280. Unlike the retroreflected rays 240a, 250a, 260a, and 270a described above, rays 240b, 250b, 260b, and 270b are not retroreflected from separation area 234. At the separation areas 234, each of the rays 240b, 250b, 260b, and 270b will typically be either transmitted out of the article 210 or absorbed. As a result, an observer viewing the first surface 220 of the retroreflective article 210 at angle α would not observe reflected light.

FIG. 4 also illustrates that light entering the retroreflective article 210 at, e.g., an angle β to the normal axis 290 of retroreflective article 210 will also be retroreflected. Rays 240c, 250c, 260c, and 270c are parallel to each other and approach the first surface 220 of the retroreflective article 210 at an angle β relative to the normal axis 290. In the preferred retroreflective articles 210, a majority of light incident on the refractive structures of the first surface 220 of article 210 along the angle β will be refracted to or superimposed on one of the retroreflective areas 232. More preferably, substantially all of the light incident on the refractive structures of the first surface 220 of article 210 at the angle β will be refracted to or superimposed on one of the retroreflective areas 232. Like the retroreflected rays 240a, 250a, 260a, and 270a described above, rays 240c, 250c, 260c, and 270c are retroreflected from one of the retroreflective areas 232.

The difference between the retroreflection of the two sets of retroreflected rays entering the retroreflective article 210 is that the rays 240c, 250c, 260c, and 270c that enter the retroreflective article 210 at angle β are retroreflected from a retroreflective area 232 that is offset across the retroreflective article 210 (relative to the normal axis 290) from the facets 222 through which the rays 240c, 250c, 260c and 270c enter the article 210. The retroreflective area 232 that retroreflects rays 240a, 250a, 260a, and 270a is located directly across from the facets 222 through which the rays 240a, 250a, 260a, and 270a enter the article 210 along the normal axis 280.

For the purposes of the present invention, rays 240a, 250a, 260a, and 270a will be referred to as "zero order" retroreflected rays, i.e., rays retroreflected from a retroreflective area 232 located directly across from the facets 222 through which the rays enter the article 210. Rays 240c, 250c, 260c, and 270c will be referred to as "first order" retroreflected rays, i.e., rays retroreflected from a retroreflective area 232 offset by one from the retroreflective area 232 located directly across from the facets 222 through which the rays enter the article 210. It can be seen that if angle β were larger in absolute value, or if the distance between the first and second surfaces 220 and 230 were larger the rays 240c, 250c, 260c, and 270c would eventually be refracted to the reach a retroreflective area 232 offset by two from the retroreflective area 232 located directly across from the facets 222 through which the rays enter the article 210. Such retroreflected rays would be referred to herein as "second order" retroreflected rays. This concept can, of course, be extended to third, fourth, fifth, sixth and larger order retroreflections. Such larger order retroreflections may, however, be limited by the retroreflective capabilities of the retroreflective structures located in the retroreflective areas 232.

The three sets of rays depicted in FIG. 4 also illustrate the flashing nature of retroreflection from at least some retroreflective articles according to the present invention. As light sweeps across the retroreflective article moving across a range of angles (with respect to the normal axis), it will at some angles preferably be refracted to or superimposed on only the retroreflective areas 232 or the separation areas 234 as illustrated by the sets of rays depicted in FIG. 4.

The retroreflective article 210 will exhibit on/off flashing retroreflection if the separation areas 234 are transmissive or absorptive. If the separation areas 234 were, instead, retroreflective with a different brightness, color, etc., then the retroreflective article 210 would exhibit the different types of retroreflection.

The retroreflective article 210 of FIG. 4 also exhibits another relationship between the structures, i.e., facets 222, on the first surface 220 and the retroreflective areas 232 and separation areas 234 on the second surface 230, namely that the retroreflective article 210 exhibits equal pitch between the structures on the two surfaces. The pitch is represented by the width of the different structures on each of the two surfaces 220 and 230. Each pair of facets 222a and 222b represents one refractive light redirecting structure on the first surface 220 with a width $w_1$ that defines the pitch of the light redirecting structures on the front surface 220. The pitch of the second surface 230 is defined by $w_2$ which includes the width of one of the retroreflective areas 232 combined with the width of one of the separation areas 234. Where the pitch of the first surface 220 is equal to the pitch of the second surface 230, the retroreflective article 210 will typically exhibit on/off retroreflective flashes as light sweeps across the first surface 220 at a range of angles because substantially all of the incident light will be refracted to or superimposed on either the retroreflective areas 232 or the separation areas 234 on the second surface 230 (because the separation areas 234 are transmissive in this embodiment).

Another variation on the retroreflective article 210 is that shifting the spatial relationship between the structures on the first and second surfaces 220 and 230 will cause a change in the angles at which the retroreflective article 210 will retroreflect light. In the embodiment depicted in FIG. 4, the center of the retroreflective areas 232 are aligned with the lines of intersection 226 of each pair of facets 222, i.e., the center of each of the retroreflective areas 232 and the lines of intersection 226 intersect the same normal axes on the retroreflective article 210. It will be understood that although the pitch can remain equal between the first and second surfaces 220 and 230, it would be possible to shift the pattern of structures on the second surface 230 up or down and that such a variation would affect the angles at which incident light would be retroreflected or transmitted through the retroreflective article 210.

FIG. 4 is also useful for illustrating the superposition of light in retroreflective articles according to the present invention as discussed above. Ray bundles 240a–250a and 260a–270a are superimposed by the refractive facets 222 on one of the retroreflective area 232 on the second surface 230 of the retroreflective article 210. In a similar manner, the refractive facets also superimpose the light represented by ray bundles 240b–250b and 260b–270b on one of the separation areas 234 on the second surface 230 of the retroreflective article 210. Finally, ray bundles 240c–250c and 260c–270c are also superimposed on one of the retroreflective areas 232 on the second surface 230 of the retroreflective article 210. The superposition provided by the refractive facets generally results in a reduction in the cross-sectional area occupied by the superimposed ray bundles. For example, ray bundles 240a–250a and 260a–270a occupy a wider area on the first surface 220 (as seen in FIG. 4) and are superimposed on each other such that they occupy a narrower area on the second surface 230, i.e., one of the retroreflective areas 232 (which is narrower than the refractive facets through which the ray bundles 240a–250a and 260a–270a enter the retroreflective article 210).

Figure 5A:
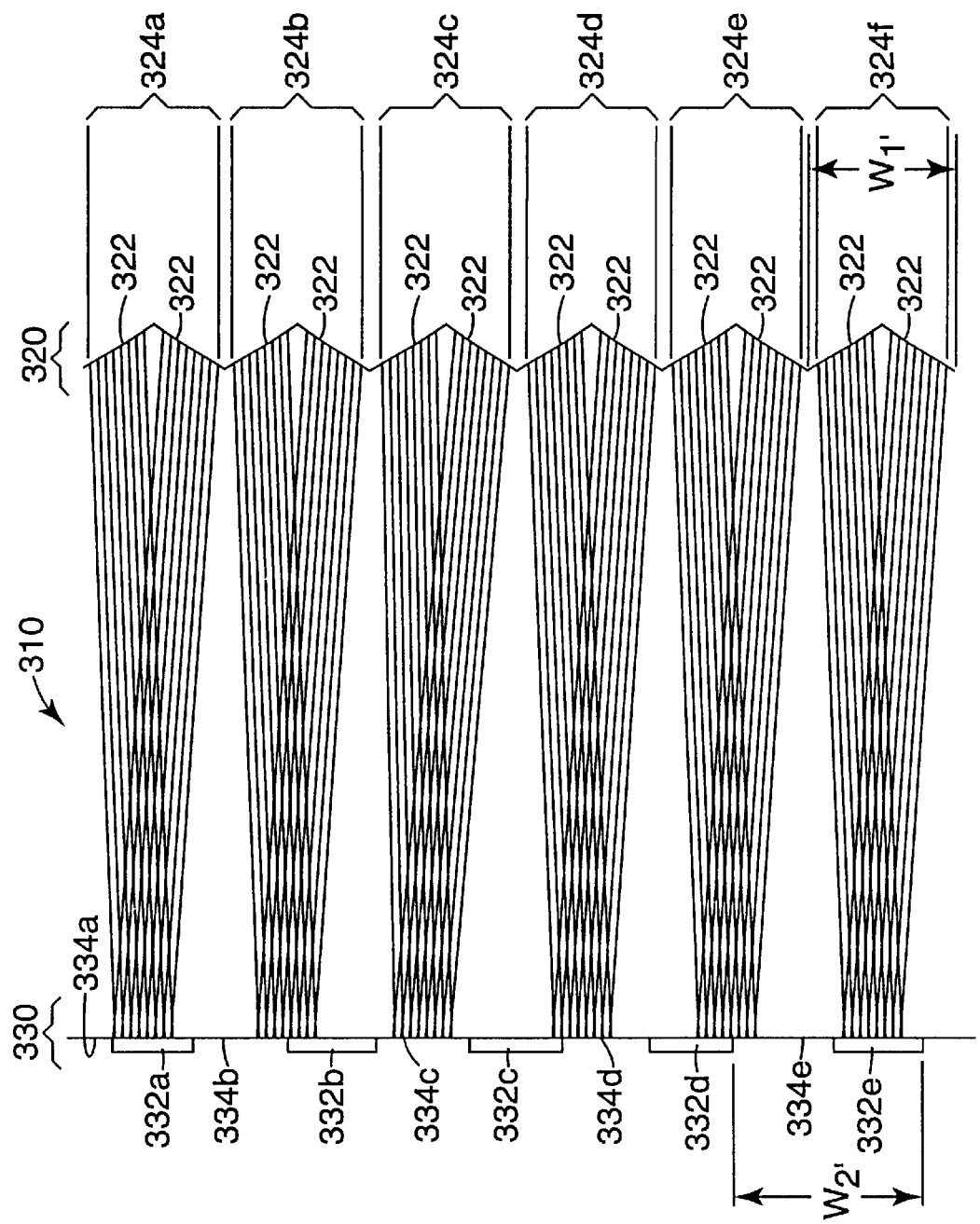
FIGS. 5a–5c are cross-sectional views of another retroreflective article according to the present invention.
Figure 5B:
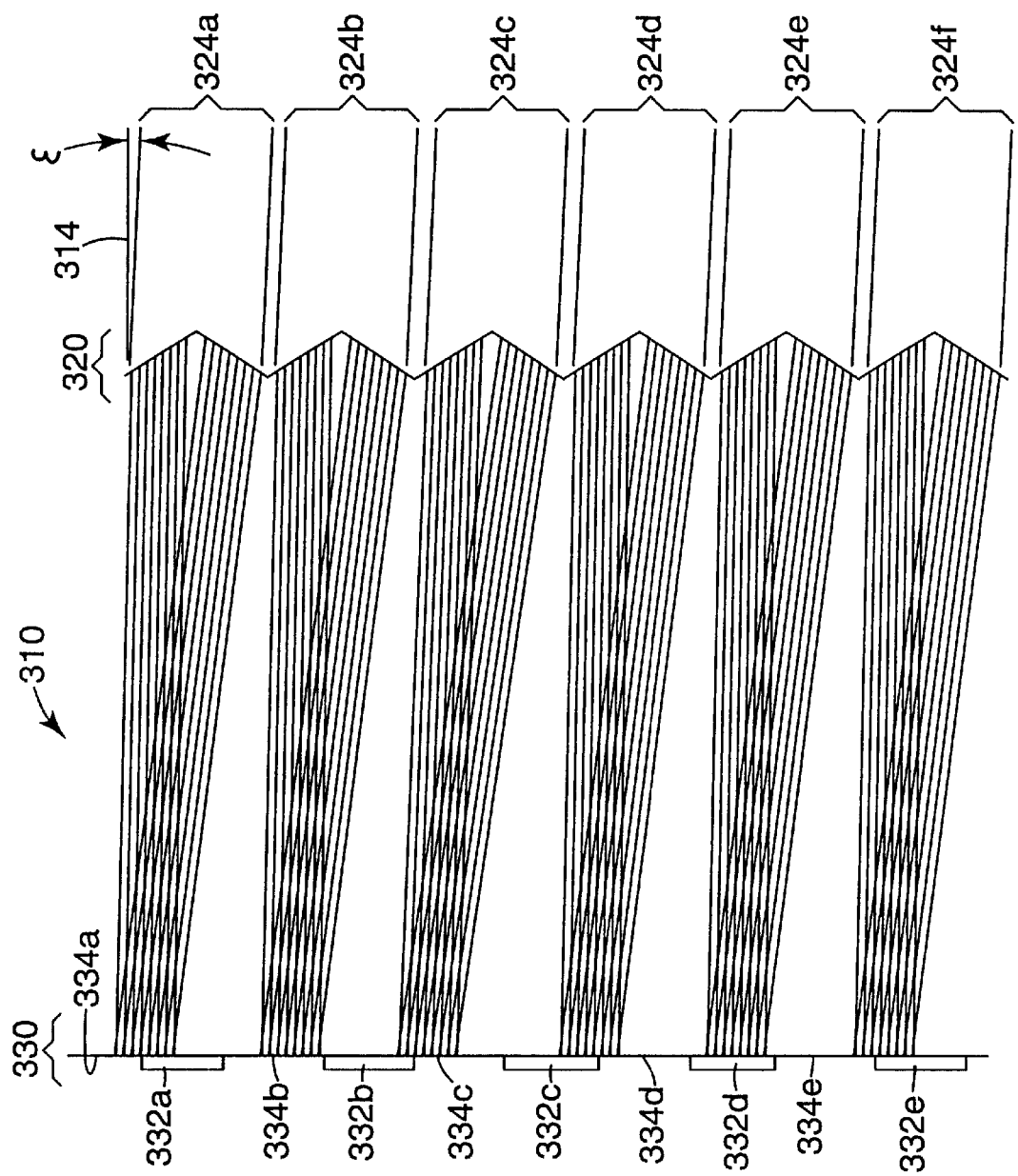
Figure 5C:
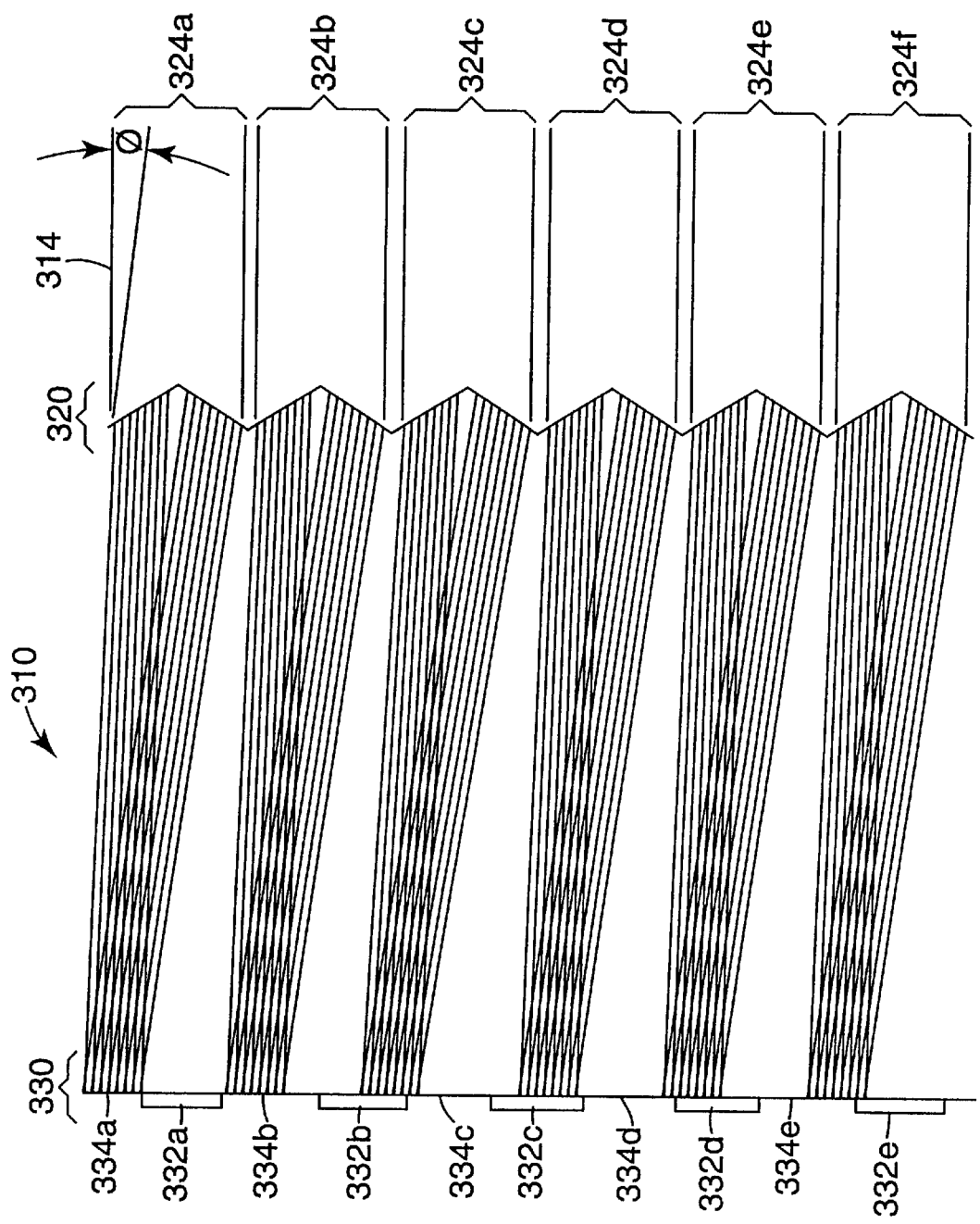
Figure 5A:
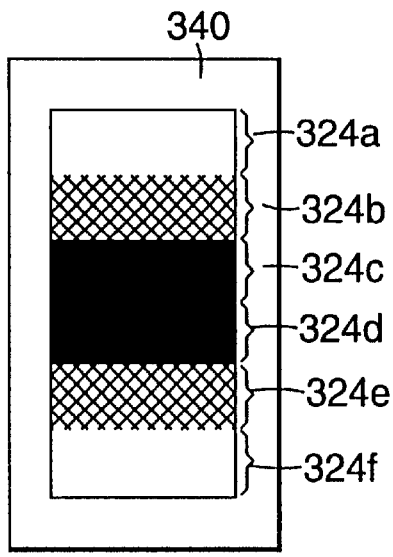
Figure 5B:
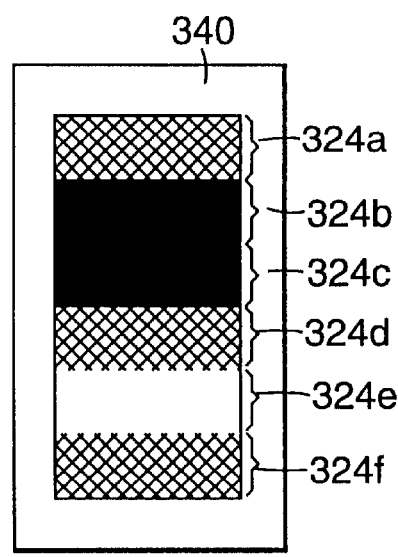
Figure 5C:
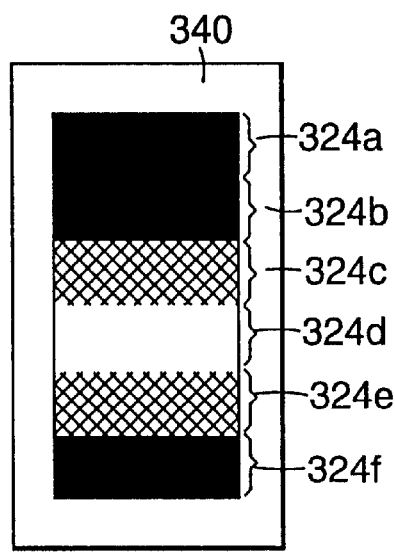

FIGS. 5a–5c and 5aa–5cc illustrate the effects of a difference in pitch between the first surface 320 and second surface 330 for a retroreflective article 310 where $w_1'$ is not equal to $w_2'$ (see FIG. 5a). FIGS. 5a/5aa illustrate the effect on normal light, while FIGS. 5b/5bb and 5c/5cc illustrate the effects on light incident at angles off of the normal axis of $\epsilon$ and $\phi$, respectively.

Over the depicted portion of the article 310, the first surface 320 includes light redirecting structures in the form of facets 322 forming six facet pairs 324a–324f while the second surface 330 includes only five retroreflective areas 332a–332e alternating with separation areas 334a–334e (which for the purposes of this discussion will be assumed to absorb substantially all light incident on them). The retroreflective areas 332a and 332e on the top and bottom of the depicted article 310 are aligned along a normal axis with facet pairs 324a and 324f, respectively, with the intervening retroreflective areas 332b–332d being misaligned with the intervening facet pairs 324b–324e on the first side 320.

The pitch of the light redirecting structures on the first surface 320 is defined by the facet pairs 324 and is represented by $w_1'$ in FIG. 5a. The pitch of the second surface is defined by the width of one of the retroreflective areas 332 and one of the separations areas 334 and is represented by $w_2'$ in FIG. 5a. For articles exhibiting a pitch mismatch ratio $w_1':w_2'$ that is closer to unity than that depicted in FIGS. 5a–5c, there could be a much larger number of facet pairs 324 and pairs of adjacent retroreflective areas and separation areas 332/334 between which the facet pairs 324 on the first surface 320 align with the retroreflective areas 332 on the second surface 330 along the normal axis 314. For the sake of simplicity, only a 6:5 pitch mismatch is depicted in FIGS. 5a–5c to explain the principles that would also apply to much smaller mismatches in pitch between the first and second surfaces 320/330, i.e., where the ratio approaches unity (e.g., a ratio of facet pairs to pairs of adjacent retroreflective areas and separation areas of 1001:1000), as well as where the number of facet pairs on the first surface is smaller than the number of pairs of adjacent retroreflective areas and separation areas. Regardless, however, it will be understood that the effects described below will also apply over large areas of microstructured retroreflective articles constructed according to the principles of the present invention.

For normal light as illustrated in FIG. 5a, substantially all of the light incident on the uppermost facet pair 324a will be refracted to the retroreflective area 332a and substantially all of the light incident on the bottom facet pair 324f will be refracted to the bottom retroreflective area 332f. As a result, substantially all of the normal light incident on the two facet pairs 324a and 324f will be retroreflected. Only a portion of the normal light incident on the facet pairs 324b and 324e will be refracted to the retroreflective areas 332b and 332e (respectively) and only a portion of this light will be retroreflected back to the same facet due at least in part to the translation effects described with respect to FIG. 1A above. As a result, only a portion of the normal light incident on the facet pairs 324b and 324e will be retroreflected. Substantially none of the normal light incident on the two middle facet pairs 324c and 324d will be refracted to a retroreflective area 332. As a result, substantially none of the normal light incident on the facet pairs 324c and 324d will be retroreflected.

FIGS. 5aa–5cc are provided to schematically illustrate the effects of pitch mismatch by an observer viewing the first surface 320 of the retroreflective article 310 for the different situations described herein. For those facet pairs 324 retroreflecting substantially all of the incident light, the corresponding facet pair 324 in the corresponding FIG. 5aa–5cc is depicted as being white (i.e., unshaded). For those facet pairs 324 retroreflecting a portion of the incident light (i.e., having intermediate brightness), the corresponding portion of FIGS. 5aa–5cc is depicted as cross-hatched. For those facet pairs 324 retroreflecting substantially none of the incident light, the corresponding facet pair 324 in FIGS. 5aa–5cc is depicted as solid black.

As best seen in FIG. 5aa, the visual effect for an observer viewing the first surface 320 of the retroreflective article 310 along the normal axis 314 for normally incident light will be the appearance of two bright bands of retroreflection at the top and bottom of the article 310 corresponding to the location of facet pairs 324a and 324f. Moving towards the center of the article 310, two bands of intermediate brightness will appear next to both of the bright bands of retroreflection, with the areas of lesser brightness corresponding to facet pairs 324b and 324e. In the center of the retroreflective article 310 (corresponding to the facet pairs 324c and 324d), the observer would view no returned light, i.e., that area of the article 310 would appear dark.

FIG. 5b illustrates the effect of the retroreflective article 310 on light incident on first surface 320 at an angle of $\epsilon$ with the normal axis of the retroreflective article 310. Only a portion of the light incident on the facet pairs 324a, 324d, and 324f will be refracted to the retroreflective areas 332a, 332c, and 332e (respectively). As a result, only a portion of the light incident on the facet pairs 324a, 324d, and 324f at angle $\epsilon$ will be retroreflected. Substantially none of the light incident on the facet pairs 324b and 324c at angle $\epsilon$ will be refracted to a retroreflective area 332. As a result, substantially none of the light incident on the facet pairs 324b and 324c at angle $\epsilon$ will be retroreflected. Substantially all of the light incident at the angle $\epsilon$ on facet pair 324e will be refracted to the retroreflective area 332e. As a result, substantially all of the light incident on facet pair 324e at angle $\epsilon$ will be retroreflected.

As best seen in FIG. 5bb, the visual effect for an observer viewing the first surface 320 of the retroreflective article 310 at an angle of $\epsilon$ relative to a normal axis will be the appearance of a single bright band of retroreflection corresponding to the location of facet pair 324e. The areas corresponding to facet pairs 324a, 324d, and 324f will appear as bands of intermediate brightness relative to the fully retroreflected light from facet pair 324e. The facet pairs 324b and 324c would return substantially none of light incident on article 310 at the angle $\epsilon$ and, as a result, that area of the article 310 would appear dark to an observer viewing the article 310 at that angle.

FIG. 5c illustrates the effect of the retroreflective article 310 on light incident on first surface 320 at an angle of $\phi$ with the normal axis of the retroreflective article 310, where the absolute value of $\phi$ is greater than the absolute value of angle $\epsilon$ depicted in FIG. 5b. Substantially all of the light incident at the angle $\phi$ on facet pair 324d will be refracted to the retroreflective area 332c. As a result, substantially all of the light incident on facet pair 324d at that angle will be retroreflected. Only a portion of the light incident on the facet pairs 324c and 324e at angle $\phi$ will be refracted to the retroreflective areas 332b and 332d (respectively). As a result, only a portion of the light incident on the facet pairs 324c and 324e at angle $\phi$ will be retroreflected. Substantially none of the light incident on the facet pairs 324a, 324b, and 324f at angle $\phi$ will be refracted to a retroreflective area 332. As a result, substantially none of the light incident on the facet pairs 324a, 324b, and 324f at angle $\phi$ will be retroreflected.

As best seen in FIG. 5cc, the visual effect for an observer viewing the first surface 320 of the retroreflective article 310 at an angle of φ relative to a normal axis will be the appearance of a single bright band of retroreflection corresponding to the location of facet pair 324d. The areas corresponding to facet pairs 324c and 324e will appear as bands of intermediate brightness relative to the fully retroreflected light from facet pair 324d. The facet pairs 324a, 324b and 324f would return substantially none of the light incident on article 310 at the angle φ and, as a result, those areas of the article 310 would appear dark to an observer viewing the article 310 at that angle.

Analysis of the effects on light incident at the various angles in FIGS. 5a–5c and 5aa–5cc will show that the effect of increasing the angle of incidence (in an absolute sense) from normal, to angle ε, and then to angle φ causes the lower band of brightness corresponding to facet pair 324f in FIG. 5a to move upwards to facet pair 324e in FIG. 5b and, finally, to facet pair 324d in FIG. 5c. That relative motion may be useful in some applications in which the areas of brightness can appear to move relative to, e.g., the driver in a vehicle moving past the retroreflective article 310 because that movement causes the angle of incidence for light from the vehicle's lights as well as the observer (i.e., driver) to move relative to the normal axis of the retroreflective article 310.

It may be helpful to provide an area 340 (see FIGS. 5aa–5cc) that is retroreflective to light approaching retroreflective article 310 from a wide range of angles (including normal light as well as light approaching at angles ε and φ). The retroreflective area 340 can provide a frame of reference for the light retroreflected from the facet pairs 324. Using that frame of reference will assist observers in discerning the shifting areas of retroreflection from the facet pairs of the retroreflective article 310.

Where facets, such as facets 222a/222b or 322a/322b, are provided as the light redirecting structures on the first surface of retroreflective articles according to the present invention, the included angle formed between the facets will typically be selected to provide the desired refraction which will be a function of the refractive index of the material or materials used to manufacture the retroreflective articles 210 and 310 and the distance between the first surface and the second surfaces of the retroreflective articles.

Although the separation areas 334 in the retroreflective article 310 are described above as being absorptive, it should be understood that the separation areas may, instead, have other optical characteristics. For example, where the separation areas 334 are transmissive, the areas corresponding to those facet pairs 324 that refract all or a portion of the incident light to the separation areas 334 may appear dark or of reduced brightness relative to the facets 324 refracting substantially all of the incident light to one of the retroreflective areas 332. Alternatively, the transmissive areas may allow for the viewing of a surface or image located proximate to the second surface 330 of the retroreflective article 310.

Alternatively, the bands of retroreflection returned from the retroreflective areas 332 through facet pairs 324 may be separated by bands of different colored retroreflection where the separation areas 334 include retroreflective structures of a different color than the retroreflective areas 332 or provide some other variation in optical effect from the retroreflective structures in the retroreflective areas 332.

Figure 6:
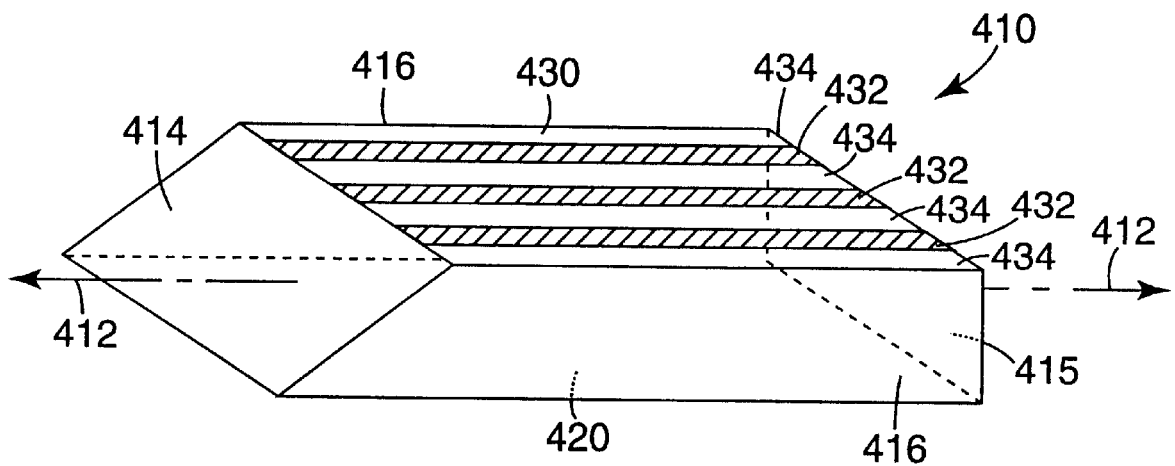
FIG. 6 is a perspective view of another retroreflective article according to the present invention.
Figure 7:
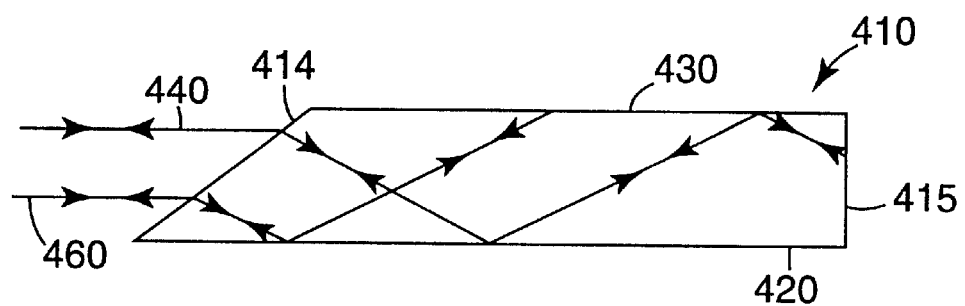
FIG. 7 is a side view the retroreflective article of FIG. 6.
Figure 8:
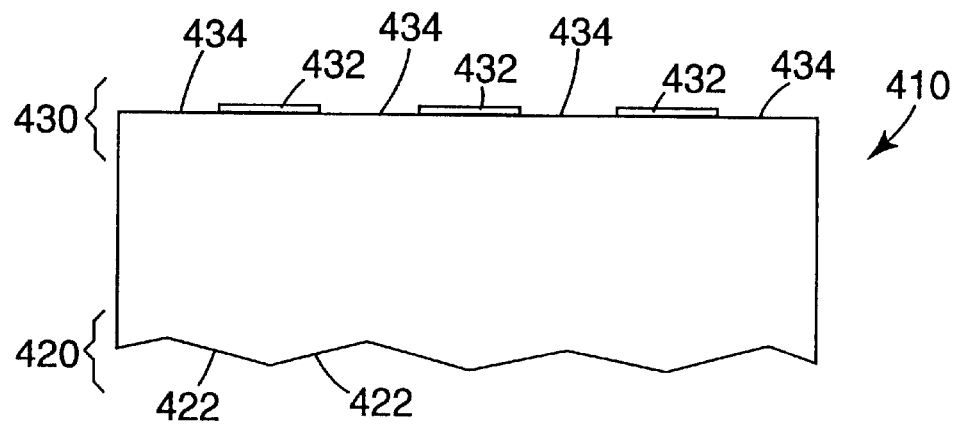
FIG. 8 is a view of the retroreflective article of FIGS. 6 and 7 taken along axis 412 in FIG. 6.

FIGS. 6–8 depict another embodiment of retroreflective articles according to the present invention. The retroreflective article 410 includes a first surface 420 and a second surface 430. Although the various embodiments of the present invention described above include refractive light redirecting structures on their first surfaces, this embodiment of the invention includes reflective light redirecting structures on the first surface 420 and a second surface 430 that includes retroreflective areas 432 and separation areas 434. Light enters the retroreflective article 410 through optical window 414 which is preferably substantially transmissive. It is preferred that the first and second surfaces 420 and 430 are generally planar. It is also preferred that the first and second surfaces 420 and 430 are generally parallel to each other. Furthermore, it is preferred that the back surface 415 extend substantially between the first and second surfaces 420 and 430.

The retroreflective areas 432 are preferably arranged in columns with the columns being generally aligned with the axis 412. The preferred retroreflective structures (not shown) located in the retroreflective areas 432 are cube corner elements, although it will be understood that the retroreflective areas 432 could include other retroreflective structures such as retroreflective beads or spheres, conical retroreflective elements and other retroreflective elements.

FIG. 7 illustrates the paths of two rays of light 440 and 460 that enter retroreflective article 410 through optical window 414. Ray 460 enters retroreflective article 410 through optical window 414 where it is refracted towards the first surface 420. From the first surface 420, ray 460 is reflected towards one of the retroreflective areas 432 on the second surface 430. As a result, ray 460 is retroreflected back towards the first surface 420. At the first surface 420, ray 460 is reflected back towards the optical window 414 where it exits the retroreflective article 410.

Ray 440 enters retroreflective article 410 through optical window 414 where and is refracted towards one of the facets 422 on the first surface 420. From the first surface 420, ray 440 is reflected towards one of the separation areas 434 on the second surface 430. In the preferred embodiment, ray 440 is specularly reflected from the separation area 434 (by, e.g., total internal reflection or with a reflective material) towards the back surface 415 of the retroreflective article 410.

In retroreflective article 410, back surface 415 is preferably retroreflective, i.e., it retroreflects light incident upon it. As a result, ray 440 is retroreflected from the back surface 415 back towards the separation area 434 where it is specularly reflected back towards the first surface 420. At the first surface 420, ray 440 is reflected back towards optical window 414 where it exits the retroreflective article on a path that is generally parallel to the path along which it entered retroreflective article 410.

In this embodiment, it is preferred that the light retroreflected from the retroreflective areas 432 on the second surface 430 be distinguishable (to an observer) from light retroreflected from the back surface 415 of the retroreflective article 410 in much the same manner that light retroreflected from the retroreflective areas of the retroreflective articles described above. One example of a difference in retroreflection is a change in the brightness or intensity of the light retroreflected from the back surface 415 as compared to the light retroreflected from the retroreflective areas 432. Another example of a difference in retroreflection is a change in the color of the light retroreflected from the back surface 415 as compared to the color of light retroreflected from the retroreflective areas 432.

Although not depicted, it will be understood that the same effect could be achieved if the separation areas 434 of the retroreflective article 410 were retroreflective in a manner that was distinguishable from the retroreflective nature of the retroreflective areas 432.

In another variation, the separation areas 434 in the retroreflective article 410 could be transmissive or absorptive, such that light incident on separation areas 434 from the first surface 420 either exits the article 410 through second surface 430 or is absorbed. The result of either transmissive or absorptive separation areas 434 is that, for light entering the article 410 through window 414, the retroreflective article 410 would exhibit retroreflection to an observer (not shown) viewing the window 414 of the retroreflective article 410 along or near to the path of the incident light only when the reflective first surface 420 reflects the incident light to the retroreflective areas 432.

As shown best in FIG. 8, the first surface 420 preferably includes light directing structures in the form of a plurality of reflective facets 422 arranged across the width of the retroreflective article 410. It is preferred that the facets 422 redirect a majority (more preferably substantially all) of the light incident upon them at a first angle towards the second surface 430 at a second angle. Both the first and second angles are preferably measured relative to, e.g., axis 412. As discussed above, the light directing structures exhibit substantially no optical focusing power for light reflecting from them as would, e.g., curved surfaces such as concave or convex mirrors.

Retroreflective article 410 may be particularly well-suited for use as a pavement marker, i.e., an object adapted for placement on a roadway to mark lanes, crosswalks, etc. It will, however, be understood that retroreflective articles similar to that depicted in FIGS. 6–8 may find other applications as well.

Figure 9:
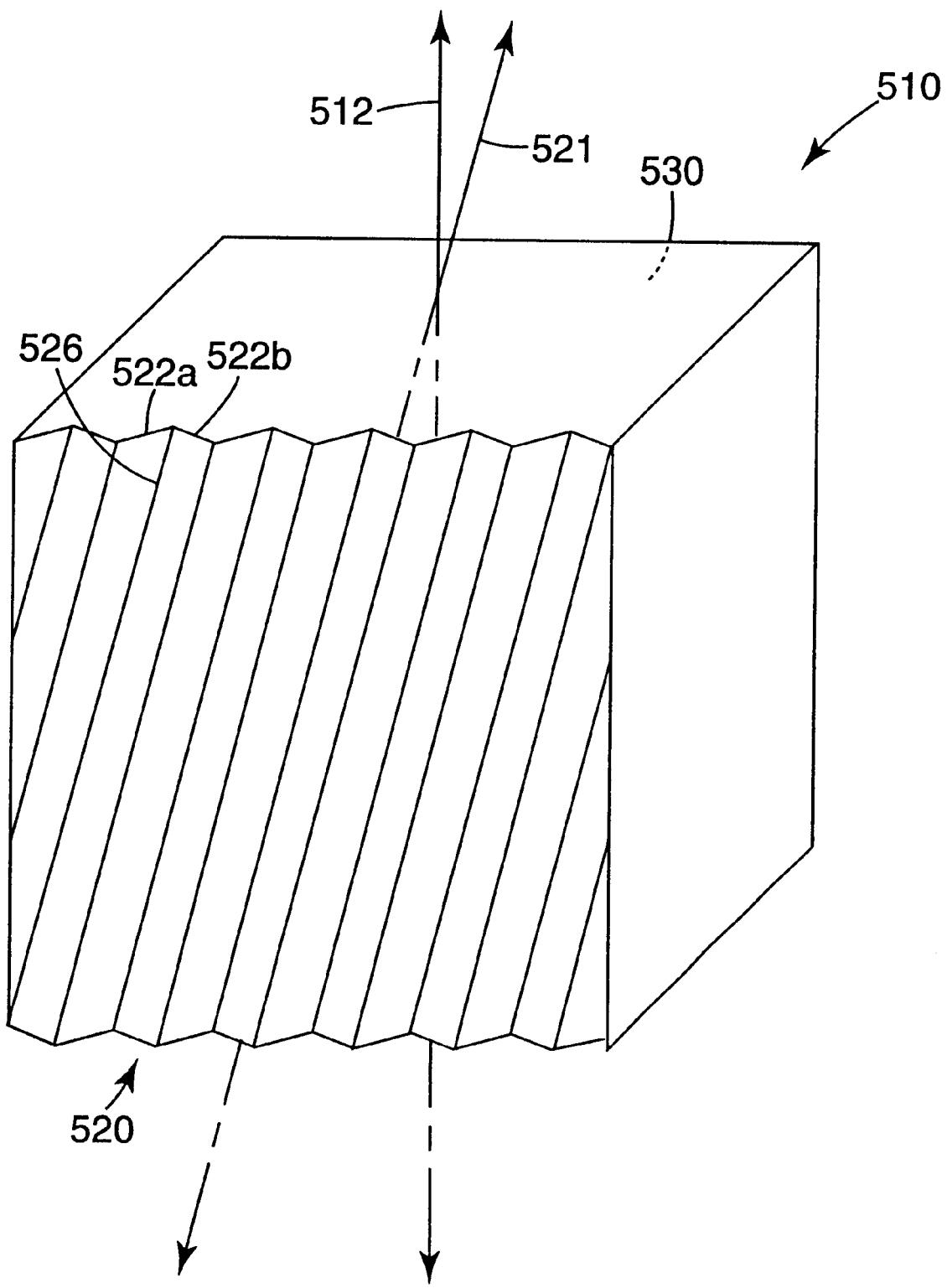
FIG. 9 is a perspective view of another retroreflective article according to the present invention.

FIG. 9 illustrates another variation in retroreflective articles according to the present invention. In the retroreflective article 510, the light directing structures on the first surface 520 include pairs of refractive facets 522a and 522b (referred to generally as facets 522) that lie in planes that intersect along lines of intersection 526. The second surface 530 preferably includes retroreflective areas and separation areas that are located in alternating columns aligned generally with axis 512. The refractive structures described above are also preferably aligned with the axis 512, but in the retroreflective article 510, the refractive structures, e.g., facets 522, are generally aligned with a second axis 521 that is not aligned with first axis 512.

The optical effects provided by orienting the light directing structures on the first surface "off-axis" with respect to the retroreflective areas and separation areas of the second surface 530 is that the retroreflective article 510 will exhibit areas that are retroreflective for light of a given angle and areas that are not retroreflective (or are retroreflective in a distinguishable manner as described above). The differences can be attributed to the redirection of light to either retroreflective areas or the separation areas depending on the relationship between the refractive structures on the first surface 520 and the retroreflective areas and separation areas on the second surface 530.

Figure 10:
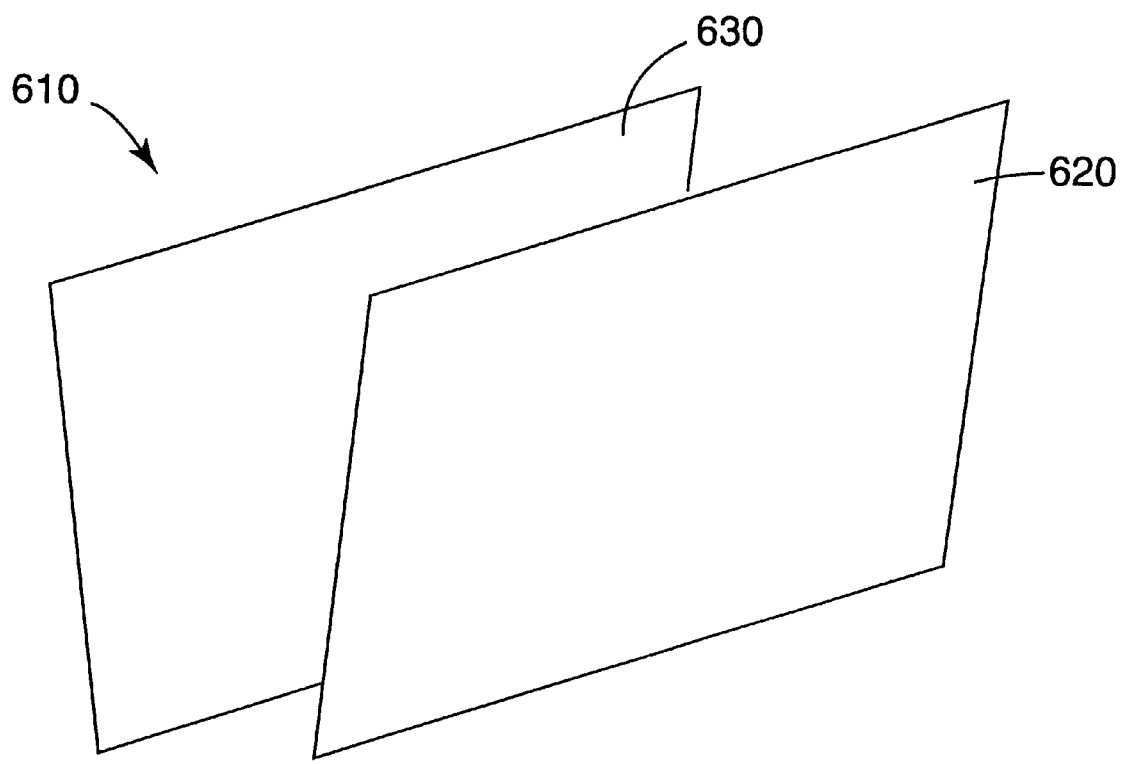
FIG. 10 is a perspective view of another retroreflective article according to the present invention.

In another variation in retroreflective articles according to the present invention is depicted in FIG. 10, where the retroreflective article 610 includes first and second surfaces 620 and 630 that are not parallel to each other. The optical effect of orienting the first and second surfaces 620 and 630 in a non-parallel arrangement is that the pattern retroreflected from the first surface 620 of the retroreflective article 610 will appear as moire effect. If the pitches on both the first and second surfaces 620 and 630 are equal, then the observed light would revert back to on/off retroreflective flashing when the first and second surfaces 620 and 630 were oriented parallel to each other and separated by the proper distance (assuming that the light incident on the separation areas was not returned to a viewer located along a path on or near the path of the incident light). The non-parallel orientation between the first and second surfaces could be accomplished using one or two separate articles. If the surfaces 620 and 630 were located on one article, e.g., a sheet, then deflection of the sheet from a planar status could effect a change in the retroreflection pattern. This effect could be useful in connection with, e.g., alignment mechanisms, temperature sensing, pressure sensing, and other situations in which deflection could be an indication of a change in some physical property.

Figure 11:
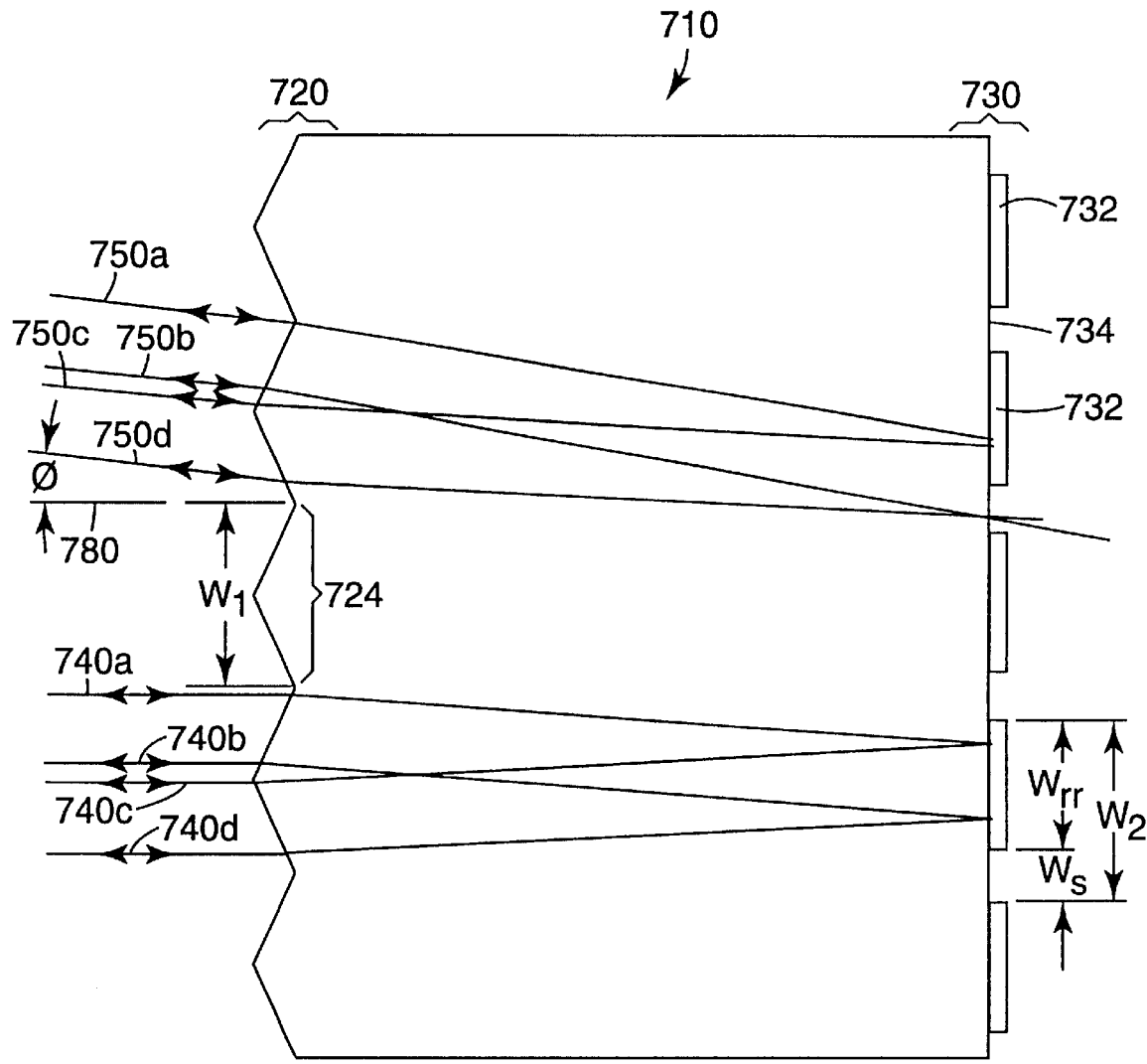
FIG. 11 is a cross-sectional view of another retroreflective article according to the present invention.

FIG. 11 depicts yet another retroreflective article 710 according to the present invention in which the relative widths of the retroreflective areas 732 and the separation areas 734 can have an effect on the optical performance of the retroreflective article 710. The width of the retroreflective areas and separation areas of the retroreflective articles thus far described have been substantially equal, i.e., each have occupied about half the width, $w_2$, that defines the pitch of the second surface of the retroreflective articles. In retroreflective article 710, however, the width, $w_{rr}$, of the retroreflective areas 732 is greater than the width, $w_s$, of the separation areas 734. i.e., the retroreflective areas 732 occupy more of the second surface than the separation areas 734. For the purposes of this discussion, the width, $w_1$, of a refractive structure, i.e., a facet pair 724 in FIG. 11, is substantially equal to the width, $w_2$, of one set of a retroreflective area 732 and adjacent separation area 734.

FIG. 11 includes a first set of rays 740a, 740b, 740c, and 740d (collectively referred to as "rays 740"), all of which approach the first surface 720 of the retroreflective article 710 along the normal axis 780. All of the rays 740 are refracted to one of the retroreflective areas 732 on the second surface 730 of the retroreflective article 710. As a result, all of the rays 740 are retroreflected on substantially the same path along which they entered the article 710. Along this approach angle, the optical performance of the retroreflective article 710 is similar to many of the retroreflective articles described above.

A second set of rays 750a, 750b, 750c, and 750d (collectively referred to as "rays 750") are also depicted in FIG. 11 and approach the first surface 720 of retroreflective article 710 at an angle θ with respect to the normal axis 780 of retroreflective article 710. The rays 750 all enter the retroreflective article 710 at the same angle, but they are not all refracted to either a retroreflective area 732 or a separation area 734. Instead, rays 750a and 750c are both refracted to the retroreflective area 732 as depicted in FIG. 11 while rays 750b and 750d are both refracted to the separation area 734 and transmitted out of the retroreflective article 710. As a result, only half of the light incident on the retroreflective article 710 at angle θ will be retroreflected, and half will be transmitted.

Figure 12:
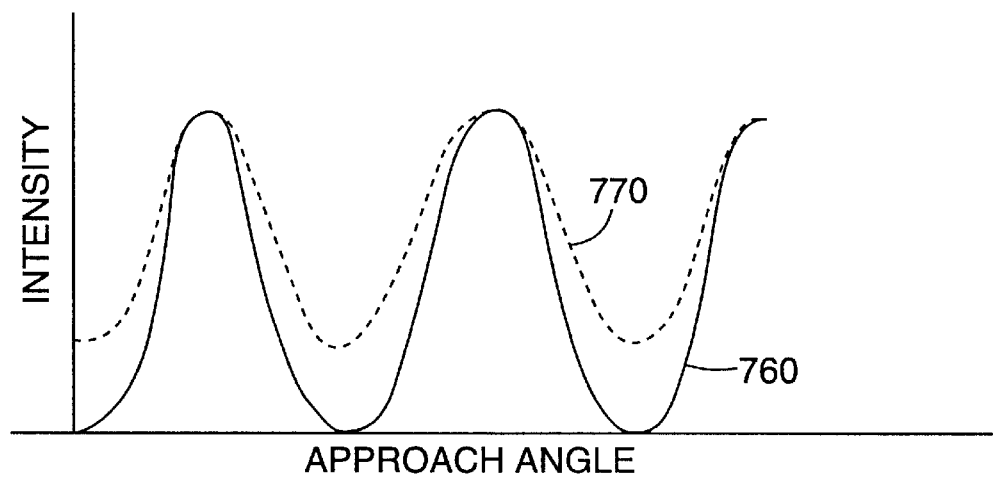
FIG. 12 is a graphical representation of the optical performance of retroreflective articles according to the present invention.

The effect of varying the percentage of the second surface occupied by retroreflective areas as compared to separation areas is graphically illustrated in FIG. 12. For the purposes of comparison, it will be assumed that light refracted to one of the separation areas is absorbed, transmitted, or otherwise affected such that it is not returned to an observer located on or near the path along which the light incident on the retroreflective article. The horizontal axis in FIG. 12 is representative of various approach angles for the incident light while the vertical axis is indicative of the intensity of the returned light.

Line 760 in FIG. 12 represents the optical performance of a retroreflective article in which the retroreflective areas are substantially equal in width to the separation areas and in which the pitch of the refractive structures on the first surface of the retroreflective article is substantially equal to the pitch of the retroreflective areas and separation areas on the second surface. The intensity of the light returned along the path of the incident light (i.e., retroreflected) is represented by line 760 and varies regularly from a maximum to zero as the approach angle of the incident light changes.

Broken line 770 in FIG. 12 represents the optical performance of retroreflective article 710 in which the retroreflective areas are three times as wide as the separation areas. The result on the intensity of the incident light retroreflected from the article 710 over a range of approach angles varies from a maximum (corresponding, e.g., to rays 740 in FIG. 11) to a minimum (corresponding, e.g., to rays 750 in FIG. 11). As a result, the retroreflective article 710 would not appear to flash on and off as the incident light and an associated observer approached the retroreflective article 710 at a changing angle (e.g., a driver approaching the retroreflective article 710 not along its normal axis). The retroreflective article 710 would, instead, appear to pulsate or vary in intensity or brightness as the approach angle varied over the range of angles depicted in FIG. 12.

FIGS. 11 and 12 can also be used to discuss another feature of the retroreflective articles according to the present invention, i.e., the ability to vary the flash rate of the retroreflective articles. Where all other variables are equal between two retroreflective articles according to the present invention, the retroreflective article that has a larger spacing between the first and second surfaces will exhibit a higher flash rate. By higher flash rate, we mean that the intensity of the light returned from a "thicker" retroreflective article will reach the maximum value more often over a given range of approach angles. With reference to FIG. 12, the peaks in lines 760 or 770 will be spaced closer for a thicker retroreflective article. Thickness of a retroreflective article for these purposes is defined as the distance between the first surface and the second surface and thus applies to retroreflective articles that are encompassed by a single body, as well as those in which the first and second surfaces are provided on separate bodies.

Figure 12A:
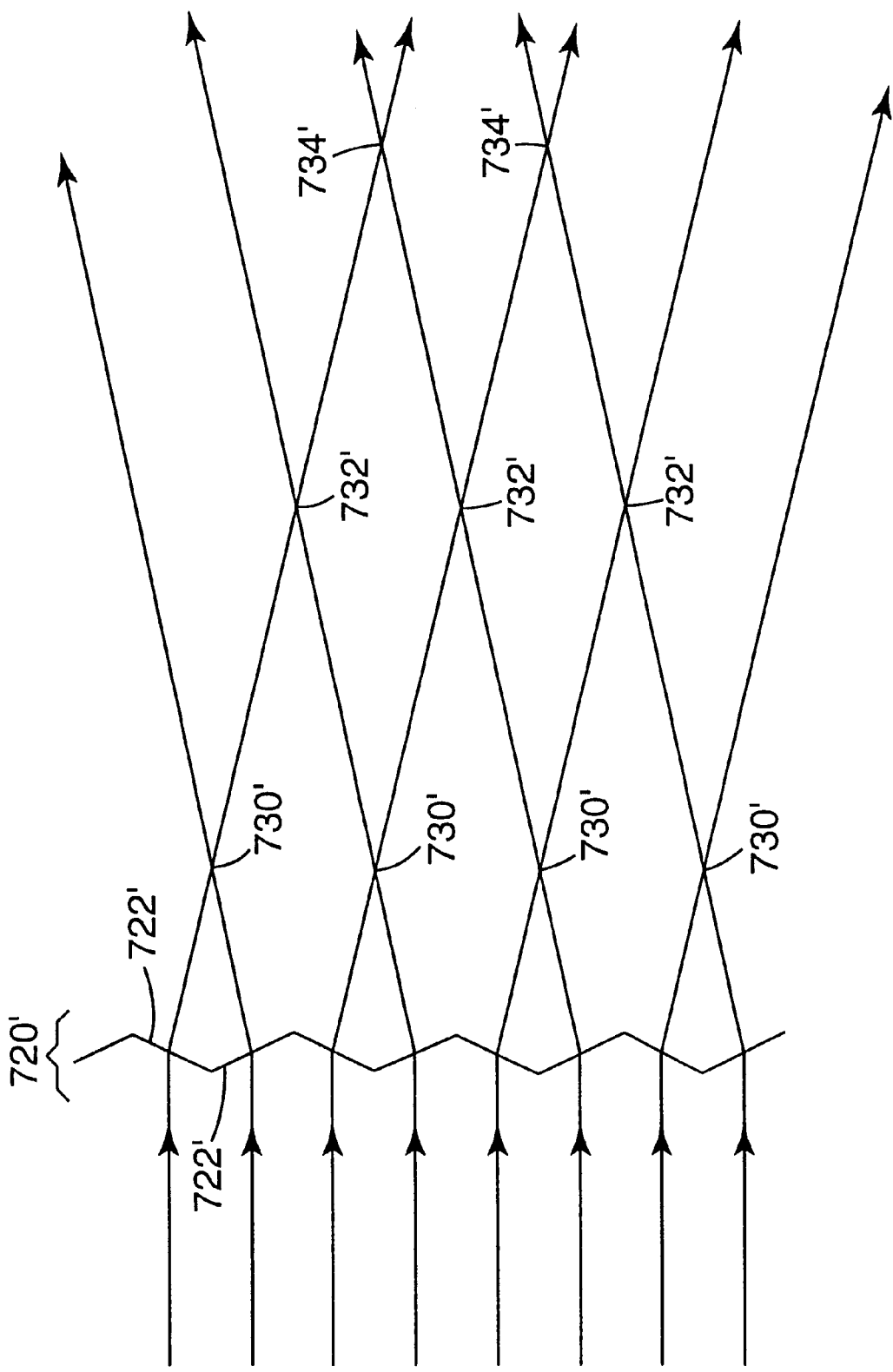
FIG. 12A is a schematic diagram of light redirected through the first surface of a retroreflective article according to the present invention.

One explanation for the increase in flash rate for retroreflective articles with a larger spacing between the first and second surfaces is depicted in FIG. 12A in which retroreflective article has a first surface 720' with a plurality of light redirecting structures depicted in the form of facets 722'. As the facets 722' redirect the light bundles incident on them, it can be seen that the centers of the redirected light bundles intersect and superimpose at nodes 730', 732' and 734' and that, for example, all of the nodes 730' are located in a line generally parallel to the first surface 720'. The spacing between the nodes 730' is the same as the spacing between the nodes 732' and nodes 734'. Because the nodes 734' are farther from the first surface 720' the angular change required to cause light that is directed through the upper node 734' to be directed through the lower node 734' is smaller than the angular change required to cause light to move between any pair of adjacent nodes 730' or 732'. That smaller change in approach angle required to move the redirected light between adjacent nodes cause the increase in flash rate discussed above.

Figure 13:
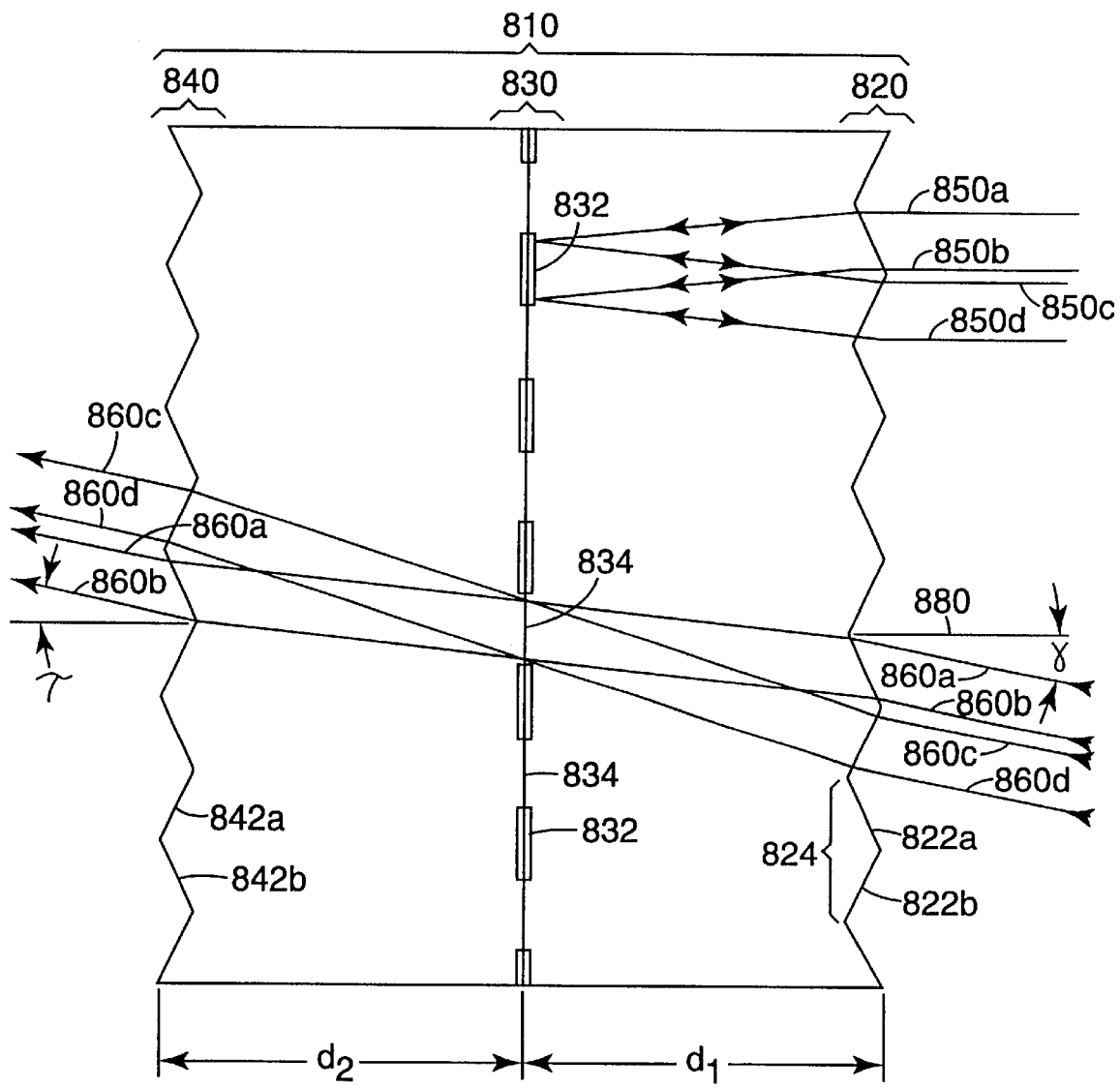
FIG. 13 is a cross-sectional view of another retroreflective article according to the present invention.

Retroreflective article 810 in FIG. 13 illustrates another feature of retroreflective articles according to the present invention. The retroreflective article 810 is preferably used as an angle dependent transmissive film or sheeting and includes a first surface 820 including refractive structures 824 (depicted as a pair of facets 822a and 822b) as well as a second surface 830 located a distance $d_1$ from the first surface 820. The second surface 830 includes retroreflective areas 832 and separation areas 834 that are preferably transmissive in this embodiment.

The retroreflective article 810 also includes a third surface 840 that includes refractive structures 844 (depicted as a pair of facets 842a and 842b) on the opposite side of the second surface 830 from the first surface 820. The third surface 840 is preferably located a distance $d_2$ from the second surface 830, where the absolute values of $d_1$ and $d_2$ are preferably substantially equal.

Rays 850a, 850b, 850c, and 850d (collectively referred to as rays 850) that enter the first surface 820 parallel to the normal axis 880 of the retroreflective article 810 are refracted to one of the retroreflective areas 832 where they are retroreflected.

Rays 860a, 860b, 860c, and 860d enter the first surface 820 of the retroreflective article 810 at an angle σ with the normal axis 880 of the retroreflective article 810. Rays 860a, 860b, 860c and 860d are refracted to one of the separation areas 834 where they are transmitted through to the third surface 840 of the retroreflective article 810.

The refractive light directing structures 844 on the third surface 840 of the retroreflective article 810 preferably correct for the refraction caused by the refractive structures 824 on the first surface 820 of the retroreflective article 810. As a result, the rays 860a, 860b, 860c, and 860d that are transmitted through the separation areas 834 exit the third surface 840 of article 810 at an angle τ relative to the normal axis 880 that is equal but opposite angle σ along which the rays enter the retroreflective article 810.

The optical effect of including a corrective third surface 840 on the opposite side of the second surface 830 from the first surface 820 is that, for light transmitted through article 810, an observer located on the side of the first surface 820 of retroreflective article 810 along the approach angle of the light may be able to view an object or image located to the left of the third surface 840 of the retroreflective article 810 as depicted in FIG. 13. It may be advantageous for the image on the left side of the article 810 (as seen in FIG. 13) to have features that are about as large or larger than the pitch of the refractive structures 844 on the third surface 840 of the retroreflective article 810.

Figure 14:
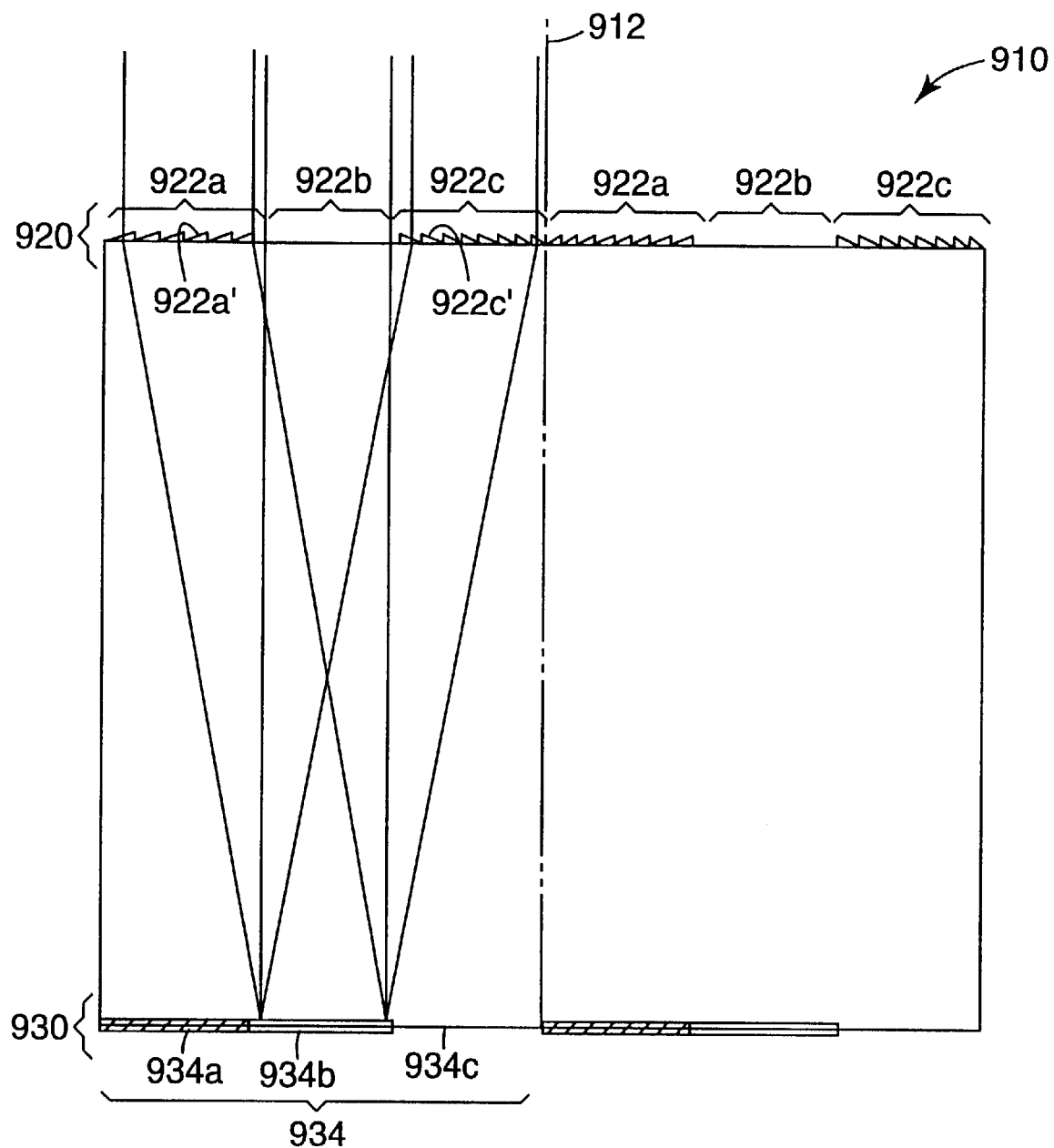
FIG. 14 is a cross-sectional view of another retroreflective article according to the present invention.

FIG. 14 depicts another embodiment of a retroreflective article 910 according to the present invention in which the first surface 920 includes a plurality of light redirecting structures. The light redirecting structures are provided in sets of three facets 922a, 922b, and 922c. Facet 922a includes a plurality of substantially planar sub-facets 922a' all formed at the same angle relative to normal axis 912 (similar in some respects to a Fresnel lens). Facet 922b is preferably provided as a substantially planar surface. Facet 922c includes a plurality of substantially planar sub-facets 922c' all formed at the same angle relative to normal axis 912. It may be preferred that the sub-facets 922c' be formed at an equal, but opposite angle with axis 912 than the angle formed by sub-facets 922a' with the axis 912. It may also be preferred that the sub-facets 922a' and/or 922c' be above the size at which diffractive effects dominate.

It is important to note that the light redirecting structures formed or provided by the facets 922a and 922c do not provide any substantial amount of optical focusing power because the sub-facets 922a' in facet 922a are parallel to each other. Sub-facets 922c' in facet 922c are also preferably parallel to each other. As a result, substantially all of the light incident on each of the facets 922a–922c at the same angle (relative to a normal axis 912) is superimposed on the second surface 930 of the retroreflective article 910. It is preferred that the facets 922a–922c superimpose all of the light approaching the first surface 920 of the article 910 at the same angle on one area of the second surface 930 that is smaller than the area occupied by the facets 922a–922c on the first surface 920. The lack of any substantial focusing power is important because of the translational effects of the retroreflective structures in the retroreflective areas 934 of the back surface 930.

Another feature of the retroreflective articles according to the present invention that is illustrated in retroreflective article 910 is that the second surface 930 can include areas that exhibit more than two different optical properties. As illustrated, the retroreflective article 910 includes three different retroreflective areas 934a, 934b, and 934c (collectively referred to as retroreflective areas 934). The different retroreflective areas 934 preferably exhibit different optical characteristics such as different colors, different intensities, etc. Preferably, but not necessarily, the retroreflective areas 934 are provided in a repeating array across the second surface 930. It will be understood that more than three different retroreflective areas 934 could be provided and that the second surface 930 could also include areas that are transmissive, absorptive, or reflective (specularly or diffusely).

As the area on which the light redirecting structures superimpose light moves in response to changing approach angles, the light will strike different retroreflective areas 934 on the second surface 930, thereby providing different optical effects based on the optical characteristics of the retroreflective area or areas 934 on which the light is superimposed.

It will be understood that the retroreflective articles according to the present invention can take the form of sheeting, films, and bodies having a rigidity not otherwise associated with sheetings or films.

Retroreflective articles according to the present invention can be manufactured by replication using molds formed by many different methods, including those typically referred to as pin bundling and direct machining. Molds manufactured using pin bundling are made by assembling together individual pins, each of which have an end portion shaped with the desired features of the retroreflective article. Examples of pin bundling are described in, e.g., U.S. Pat. No. 3,926,402 to Heenan et al., and United Kingdom Patent Nos. 423,464 and 441,319 to Leray. The direct machining technique, sometimes referred to as ruling, involves cutting portions of a substrate to create a pattern of grooves that intersect to form retroreflective structures. Examples of such ruling, shaping and milling techniques are described in U.S. Pat. Nos. 3,712,706 (Stamm); 4,349,598 (White); 4,588,258 (Hoopman); 4,895,428 (Nelson et al.); 4,938,563 (Nelson et al.). Although the retroreflective articles of the present invention described herein will generally be manufactured from molds formed by direct machining, it will be understood that any other suitable methods could be used.

Figure 15:
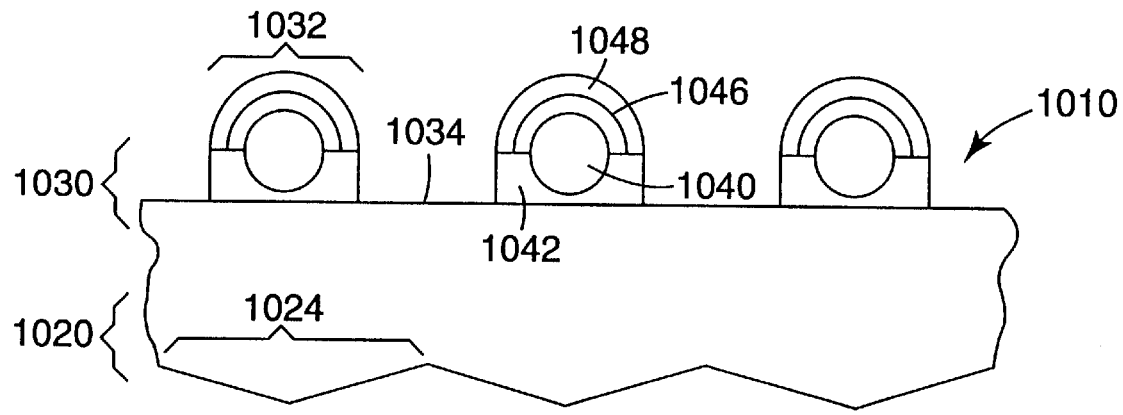
FIG. 15 is a cross-sectional view of another retroreflective article according to the present invention.

Because of the sensitivity of the retroreflective articles to variations in pitch and relative positioning between the first and second surfaces, one method of manufacturing a retroreflective article 1010 (see FIG. 15) according to the present invention will be described. The retroreflective article 1010 includes a first surface 1020 including refractive light directing structures 1024 as described above. The second surface 1030 of the retroreflective articles 1010 includes a plurality of retroreflective areas 1032 and separation areas 1034.

The retroreflective areas 1032 each include a plurality of retroreflective beads 1040 located in a binder 1042 that is bonded in place on the retroreflective article 1010. The beads 1040 may also be partially encapsulated by a spacer coat 1046 and reflective material 1048 as is well known to those skilled in the art. The binder 1042 is preferably cured by the use of light energy, e.g., ultraviolet light, as is well known. As a result, the retroreflective areas can be formed with the proper pitch using light energy in the process described below. One method of manufacturing the retroreflective article 1010 will now be described.

Figure 16:
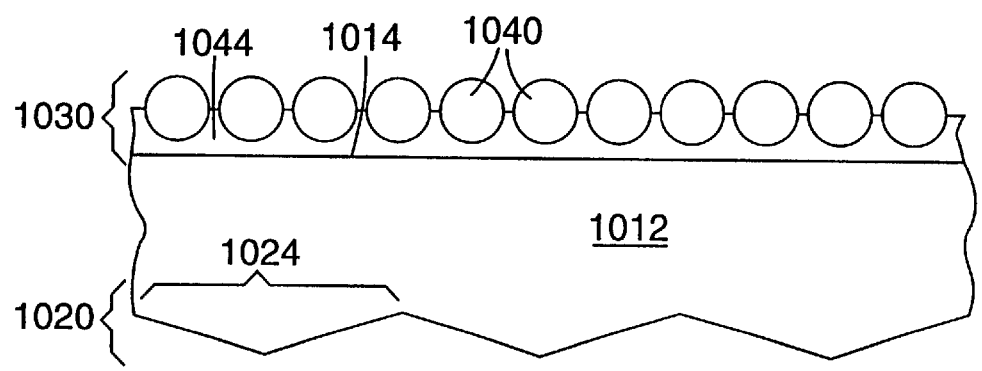
FIG. 16 is a cross-sectional view of the retroreflective article of FIG. 15 during manufacturing.

The first surface 1020 including the refractive light redirecting structures 1024 would be formed in a suitable body 1012 such as a sheet or film in which the opposing surface 1014 was preferably smooth, i.e., planar. The opposing surface 1030 would then be coated over substantially its entire surface with a mixture of retroreflective beads 1040 and binder solution 1044 (see FIG. 16). Light energy with the appropriate wavelength(s) required to cure the binder solution would then be directed at the first surface 1020 such that the light energy is refracted through the body 1012 to the retroreflective areas 1032 on the finished retroreflective article 1010 (see FIG. 15). In those areas where the light energy is incident on the binder solution 1044, the retroreflective beads 1040 will be retained in the cured binder 1042. In those areas where the light is not incident on the binder solution 1044, the beads 1040 and binder solution can be removed after the retroreflective areas 1032 have been cured. Application of any spacer coats and reflective materials can be accomplished by any suitable method.

One significant advantage to this method is that the angle of the light energy used to cure the binder 1042 can be controlled, resulting in accurate formation of the retroreflective areas 1032 and separation area 1034 relative to the position of the light directing structures 1024 on the first surface 1020 of the retroreflective article 1010 for that angle of incident light. The result is that exposures at different angles can be used to create the desired retroreflective properties in the retroreflective article 1010.

Figure 17:
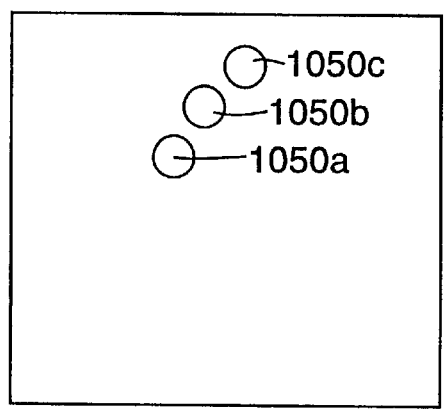
FIG. 17 is plan view of the first surface of the retroreflective article of FIG. 15.

In addition to exposures at different angles, it may be advantageous to mask the first surface 1020 before exposure to create visual images in the retroreflected light at the various angles. For example, a bubble could appear to move from the bottom of the retroreflective article 1010 towards its top as illustrated in FIG. 17. The incident light is presented at a first angle relative to the normal axis of the article 1010 corresponding the first angle at which the retroreflective article 1010 was exposed during manufacturing. The bubble 1050a would appear in the light retroreflected from the retroreflective article 1010. When the incident light approached article 1010 along the normal axis, light could be retroreflected from an image of the bubble 1050b (while light would not be retroreflected from the first bubble 1050a). As the approach angle of the light continued to change, light would then be retroreflected from a third image of a bubble 1050c near the top of the article 1010 (while bubbles 1050a and 1050b were not visible). In other words, each of the bubbles 1050 would appear in light approaching the article 1010 at a different angle that would generally correspond to the angle at which the article 1010 was exposed during manufacturing. Many variations of this concept will be apparent based on the above description.

The retroreflective articles according to the present invention can be provided in macro- or micro-structured form (or a combination of both) and will typically exhibit the retroreflective properties discussed above in any form. Macro-structured articles can be provided from many different materials and in any appropriate dimensions depending on the intended application or use of the articles. Micro-structured articles will typically include small optical elements such as cube corners, facets, etc., sized such that the pitch of the refractive structures on the first surface of the retroreflective articles and the pitch of the retroreflective areas and separation areas on the second surface of the retroreflective articles is about 0.03 inches (0.75 millimeters) or less, although in some instances it may be preferable to provide retroreflective articles in which the pitch of the features on the first and second surfaces is about 0.01 inches (0.25 millimeters) or less, and even more preferably about 0.005 inches (0.13 millimeters) or less. It may further be advantageous to use thin micro-structured sheeting incorporating the structures described above in some situations. The thin micro-structured sheeting may more preferably be flexible as described in, for example, U.S. Pat. No. 4,906,070 (Cobb, Jr.).

Suitable materials for retroreflective articles according to the present invention can vary, although the articles will typically be manufactured from transparent materials that are dimensionally stable, durable, weatherable, and easily replicated in the desired configuration. Examples of suitable materials include glass, acrylics with an index of refraction of about 1.49 (e.g., PLEXIGLASS brand resin from Rohm & Haas Company), polycarbonates with an index of refraction of about 1.59, polyethylene based ionomers (e.g., SURLYN brand from E. I. DuPont de Nemours and Co., Inc.), polyesters, polyurethanes, and cellulose acetate butyrates. Other examples include reactive materials such as those taught in U.S. Pat. Nos. 4,576,850; 4,582,885; and 4,668,558.

The inventive retroreflective articles may be constructed according to the principles of U.S. Pat. No. 5,450,235 where the cube-corner elements are made of a high modulus polymer and an overlapping body layer is made of a softer lower modulus polymer. Such a construction would also allow the inventive articles to be employed on articles of clothing as discussed below.

Polycarbonates may be used because of their toughness, temperature stability, and relatively higher refractive index (about 1.59) which generally contributes to improved retroreflective performance over a wider range of entrance angles when using second surface reflectors. The higher index of refraction provides a larger index of refraction difference to enhance total internal reflection at the structured surfaces. In some instances where transmission of light through the retroreflective article, using, e.g., separation areas or truncated structures, it may be desirable to use materials with lower indices of refraction to improve the range of light transmitted through the article. For example, where transmission is important, acrylics (with an index of refraction of about 1.49) may offer an advantageous combination of properties. The materials used to form retroreflective articles may also include UV stabilizers or other additives to improve their weatherability, durability, toughness or any other desired property.

Where necessary, the retroreflective article according to the present invention may include a reflective coating as needed to enhance their reflective properties. Such coatings could include a metal or a dielectric stack.

Where colors are to be employed in retroreflective articles according to the present invention, any suitable coloring agent or agents may be used. The term "coloring agent" will be used herein to refer to any dye, colorant, pigment, etc. used to effect a visible color change in light exiting from the retroreflective articles according to the present invention.

The retroreflective articles according to the present invention may be applied to a variety of substrates using mechanical methods such as sewing. In some applications, however, it may be desirable to secure the article to a substrate using adhesives such as a pressure-sensitive adhesive, heat-activatable adhesive, or an ultraviolet radiation activated adhesive. The substrate bearing the retroreflective article can be located on the outer surface of an article of clothing, enabling the retroreflective article to be displayed when the clothing is worn in its normal orientation on a person. The substrate may be, for example, a woven, knit or nonwoven fabric containing cotton, wool, flax, nylon, olefin, polyester, cellulose, rayon, urethane, vinyl, acrylic, rubber, spandex, and the like, or it could be made of leather or paper.

Figure 18:
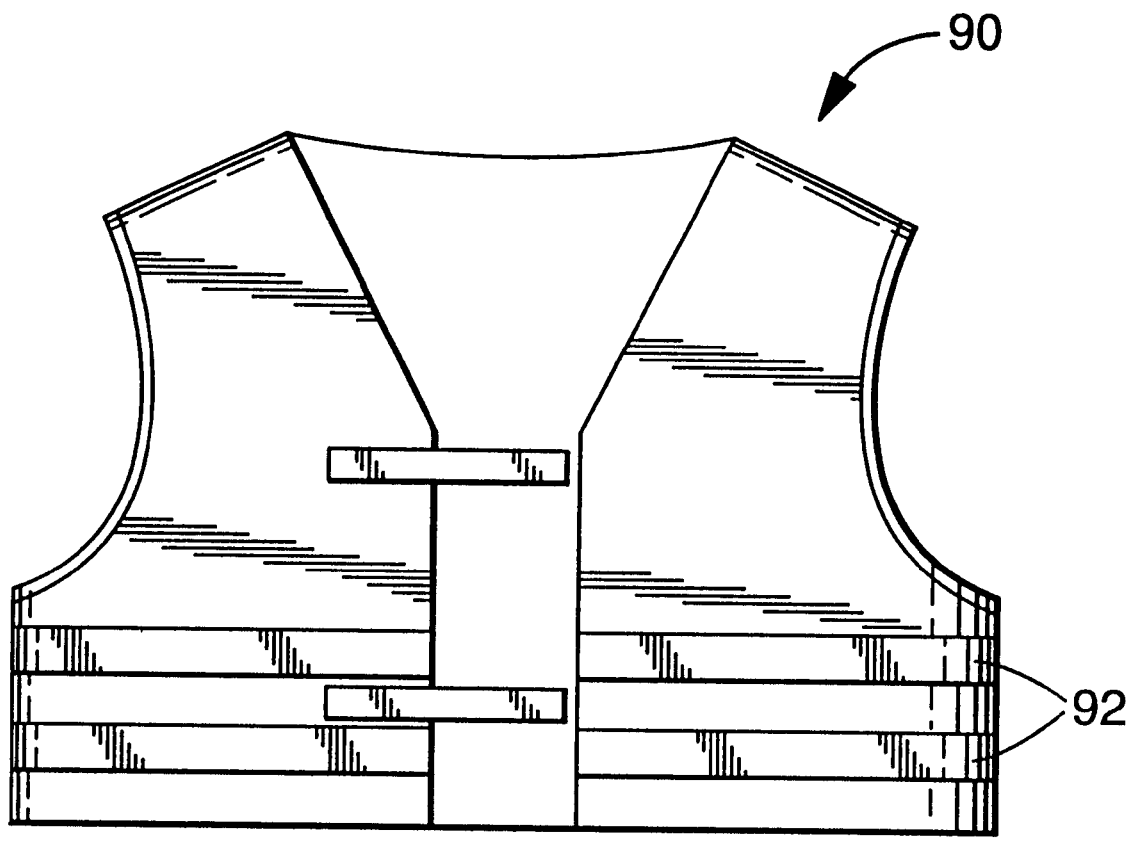
FIG. 18 illustrates an article of clothing including a retroreflective article according to the present invention.

FIG. 18 illustrates a safety vest 90 displaying a retroreflective article 92 in the form of an elongated sheeting or strip. Safety vests are often worn by road construction workers and police officers to improve their visibility to oncoming motorists. Although a safety vest has been chosen for this illustration, articles of clothing including retroreflective articles according to the present invention may be provided in a variety of forms. As the term is used herein, "article of clothing" means an item of wearing apparel sized and configured to be worn or carried by a person. Other examples of articles of clothing that may display retroreflective articles of the invention include shirts sweaters, jackets (e.g., fireman's jackets), coats, pants, shoes, socks, gloves, belts, hats, suits, one-piece body garments, bags, backpacks, etc.

EXAMPLE

The following example is provided as an illustration of one retroreflective article according to the present invention. It is recognized, however, that while the example serves this purpose, the particular materials and shapes, as well as other conditions and details, are not to be construed in a manner that would unduly limit the scope of this invention.

A flashing retroreflective article was constructed of 0.125 inch (3.18 millimeters) polycarbonate sheet material having an index of refraction of 1.59. The polycarbonate sheet material had a thickness of 0.1115 inches (2.83 millimeters) measured after the structured surfaces were formed therein.

A first surface of the sheet was formed into pairs of facets similar to those depicted in, e.g., surface 120 in FIG. 2, under suitable pressure and temperature conditions. The included angle formed by each pair of facets was 160.7 degrees and the facets were formed with a pitch of 0.028 inches (0.71 millimeters).

The opposing second surface of the sheet was formed into columns of cube corners separated by separation areas as depicted in, e.g., surface 130 in FIG. 2, at the same time as the facets were being formed in the first surface. The columns of cube corners had a width of 0.014 inches (0.36 millimeters) and the separation areas (also formed in columns) had the same width as the columns of cube corner elements. As a result, the pitch of the second surface was also 0.028 inches (0.71 millimeters), i.e., equal to the pitch of the light directing refractive facets on the first surface of the sheet.

The resulting retroreflective article exhibited on and off flashing when moved relative to a light source and observer. The superimposed light moved between the retroreflective areas and separation areas on the second surface to achieve the flashing effect.

The patents, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A retroreflective article comprising:
    a first surface including a plurality of light redirecting structures;
    a second surface opposite the first surface, the second surface including a plurality of retroreflective areas retroreflecting light towards the first surface; and
    a plurality of separation areas on the second surface, each of the separation areas located between the retroreflective areas;
    wherein a substantial portion of light incident on the plurality of light redirecting structures on the first surface of the retroreflective article at a given angle is superimposed on the second surface of the retroreflective article.

2. The retroreflective article of claim 1, wherein the retroreflective areas and the separation areas are arranged in alternating columns on the second surface, the columns being generally aligned with a first axis and having a width generally transverse to the first axis.

3. The retroreflective article of claim 2, wherein the retroreflective areas and the separation areas on the second surface are provided in a repeating pattern.

4. The retroreflective article of claim 3, wherein the width of each of the plurality of retroreflective areas is substantially equal to the width of each of the plurality of separation areas.

5. The retroreflective article of claim 1, wherein each of the plurality of retroreflective areas comprises a plurality of retroreflective elements.

6. An article according to claim 1, wherein a substantial portion of light incident on the separation areas from the first surface is transmitted through the separation areas.

7. The retroreflective article of claim 1, wherein a substantial portion of light incident on the separation areas is absorbed.

8. The retroreflective article of claim 1, wherein each of the plurality of retroreflective areas comprises a plurality of first retroreflective elements, and further wherein each of the plurality of separation areas comprises a plurality of second retroreflective elements, wherein at least one optical characteristic of the first and second retroreflective elements is different.

9. The retroreflective article of claim 2, wherein the plurality of light redirecting structures are arranged in columns generally aligned with the first axis.

10. The retroreflective article of claim 9, wherein each of the plurality of light redirecting structures comprises a substantially planar facet.

11. The retroreflective article of claim 10, wherein the plurality of light redirecting structures comprises a plurality of facet pairs, each of the facet pairs comprising two facets located in facet planes, the facet planes of each facet pair intersecting along a line of intersection, wherein the lines of intersection for the facet pairs are generally aligned with the first axis.

12. The retroreflective article of claim 11, wherein the first and second surfaces are generally planar.

13. The retroreflective article of claim 11, wherein the first and second surfaces are generally parallel.

14. A retroreflective article comprising:
    a first surface including a plurality of light redirecting structures, each of the light redirecting structures comprising a facet pair including two facets located in facet planes, the facet planes of each facet pair intersecting along a line of intersection, wherein the lines of intersection for each of the facet pairs are generally aligned with a first axis;
    a second surface including a plurality of retroreflective areas, each of the retroreflective areas comprising a plurality of retroreflective elements retroreflecting light towards the first surface, wherein the retroreflective areas comprise columns generally aligned with the first axis; and
    a plurality of separation areas on the second surface, each of the separation areas located between the retroreflective areas;
    wherein at least a portion of light incident on each of the facet pairs on the first surface of the retroreflective article at a given angle is superimposed on the second surface of the retroreflective article.

15. The retroreflective article of claim 14, wherein the width of each of the plurality of retroreflective areas is substantially constant across the second surface.

16. The retroreflective article of claim 14, wherein the widths of the plurality of separation areas is substantially constant across the second surface.

17. The retroreflective article of claim 14, wherein the width of each of the plurality of retroreflective areas is substantially equal to the width of each of the plurality of separation areas.

18. The retroreflective article of claim 14, wherein the plurality of light redirecting structures have a substantially uniform pitch.

19. The retroreflective article of claim 14, wherein the widths of each of the plurality of retroreflective areas, each of the plurality of separation areas, and each of the plurality of refractive structures are substantially equal.

20. A retroreflective article comprising:
    a body having a first surface and a second surface opposite the first surface;
    a plurality of retroreflective areas on the second surface of the body, the retroreflective areas comprising a plurality of retroreflective elements, wherein the retroreflective areas comprise columns generally aligned with a first axis;
    a plurality of separation areas on the second surface of the body, each of the separation areas located between the retroreflective areas;
    an optical window located between the first and second surfaces, the optical window transmitting light into the body; and
    a plurality of light directing structures located on the first surface of the body, wherein a substantial portion of light incident on the plurality of light redirecting structures at a given angle from the optical window is superimposed on the second surface of the retroreflective article.

21. The retroreflective article of claim 20, wherein the plurality of light redirecting structures comprises a plurality of reflective facet pairs, each of the facet pairs comprising two facets located in facet planes, the facet planes of each facet pair intersecting along a line of intersection, wherein the lines of intersection for the facet pairs are generally aligned with the first axis.

22. The retroreflective article of claim 20, wherein the body further comprises a third surface located between the first and second surfaces and generally opposite the optical window, the third surface comprising a plurality of retroreflective structures.

23. The retroreflective article of claim 22, wherein the retroreflective structures of the second surface retroreflect light having a first color and the retroreflective structures of the third surface retroreflect light having a second color.

24. The retroreflective article of claim 20, wherein the first and second surfaces are generally planar.

25. The retroreflective article of claim 24, wherein the first and second surfaces are generally parallel.

26. The retroreflective article of claim 24, wherein the third surface is generally planar.

27. The retroreflective article of claim 24, wherein the first surface intersects the second surface.

28. The retroreflective article of claim 27, wherein the first and second surfaces are generally planar.

29. The retroreflective article of claim 20, wherein the body comprises a pavement marker.

30. A method of manufacturing a retroreflective article comprising steps of:
  providing a first surface including a plurality of light redirecting structures and a second surface opposite the first surface, the second surface being separated from the second surface by an optically transmissive medium;
  providing a light curable binder solution on the second surface;
  providing a plurality of retroreflective elements proximate the second surface, each of the plurality of retroreflective elements at least partially immersed in the binder solution;
  forming retroreflective areas on the second surface by directing light energy through the first surface to cure selected areas of the binder solution on the second surface, wherein the binder solution in the selected areas is sufficiently cured to retain a substantial portion of the retroreflective elements; and
  removing the retroreflective beads from the uncured binder solution on the second surface to form separation areas between the retroreflective areas;
  wherein a substantial portion of light incident on the plurality of light redirecting structures on the first surface of the retroreflective article at a given angle is superimposed on the second surface of the retroreflective article.

31. A method according to claim 30, further comprising providing the retroreflective areas and the separation areas on the second surface in a repeating pattern.

32. A method according to claim 31, further comprising forming the width of each of the plurality of retroreflective areas substantially equal to the width of each of the plurality of separation areas.

33. An article of clothing comprising the retroreflective article of claim 1, the retroreflective article being secured to the article of clothing.

34. An article of clothing comprising the retroreflective article of claim 14, the retroreflective article being secured to the article of clothing.

* * * * *